(12) United States Patent
Memon et al.

(10) Patent No.: US 9,009,299 B2
(45) Date of Patent: Apr. 14, 2015

(54) METHOD AND APPARATUS FOR IDENTIFYING MEMBERS OF A PEER-TO-PEER BOTNET

(75) Inventors: Nasir Memon, Holmdel, NJ (US); Baris Coskun, Weehawken, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 873 days.

(21) Appl. No.: 12/986,573

(22) Filed: Jan. 7, 2011

(65) Prior Publication Data

US 2011/0179164 A1    Jul. 21, 2011

Related U.S. Application Data

(60) Provisional application No. 61/292,887, filed on Jan. 7, 2010.

(51) Int. Cl.
  *G06F 15/173* (2006.01)
  *H04L 29/06* (2006.01)
  *H04L 29/08* (2006.01)

(52) U.S. Cl.
  CPC ......... *H04L 63/1441* (2013.01); *H04L 63/1433* (2013.01); *H04L 67/104* (2013.01); *H04L 67/1057* (2013.01)

(58) Field of Classification Search
  USPC ........... 709/224; 713/182, 150; 380/277, 286; 726/2, 21, 36
  See application file for complete search history.

(56) References Cited

U.S. PATENT DOCUMENTS

| | | | |
|---|---|---|---|
| 8,204,984 B1 * | 6/2012 | Aziz et al. | 709/224 |
| 2005/0223102 A1 * | 10/2005 | Zhang et al. | 709/228 |
| 2008/0080518 A1 * | 4/2008 | Hoeflin et al. | 370/395.42 |
| 2010/0067377 A1 * | 3/2010 | Wang et al. | 370/230 |

OTHER PUBLICATIONS

Wang, Ping; Wu, Lei; Aslam, Baber; Zou C., Cliff; "A Systematic Study on Peer-to-Peer Botnets"; 2009; ICCCN '09 Proceedings of the 2009 Proceedings of 18th International Conference on Computer Communications and Networks. pp 1-8.*

* cited by examiner

*Primary Examiner* — Jason K. Gee
*Assistant Examiner* — Sharif E Ullah
(74) *Attorney, Agent, or Firm* — John C. Pokotylo; Straub & Pokotylo

(57) ABSTRACT

A peer-to-peer (P2P) bot(s) in a network is identified using an already identified P2P bot. More specifically, such embodiments may facilitate determining a candidate set of computers, which may be potential P2P bots, by identifying computers in a network that have a private mutual contact with a seed bot, which is a computer identified as a P2P bot, and identifying additional computers that have private mutual contacts with the identified computers. Further, a confidence level indicative of a certainty of a membership of each of the candidate computers in the P2P botnet is determined and responsive to a determination that the confidence level of the candidate computer exceeds a determined threshold confidence level, the candidate computer is identified as a P2P bot.

27 Claims, 27 Drawing Sheets

Algorithm 1 $Dye\_Pumping(\mathbf{A}, s, maxIter)$

1: $\bar{\mathbf{A}} \leftarrow normalize(\mathbf{A})$
2: $D \leftarrow [0, 0, \ldots, 0]^T$ {initialize $D$ as a zero vector}
3: for $iter = 1$ to $maxIter$ do
4: $\quad D(s) \leftarrow 1$ {Pump dye from the seed node}
5: $\quad D \leftarrow \dfrac{D}{\sum D(i)}$ {Normalize fluid level vector}
6: $\quad D \leftarrow \bar{\mathbf{A}} D$ {Distribute dye in network for one iteration}
7: end for
8: output $D$

FIGURE 6A

Algorithm 1 $Dye\_Pumping(\mathbf{E}, s, maxIter)$

1: $\mathbf{T} \leftarrow computeTransitionMatrix(\mathbf{E})$
2: $\overline{\mathbf{T}} \leftarrow normalize(\mathbf{T})$
3: $L \leftarrow [0, 0, ..., 0]^{tr}$ {initialize $L$ as a zero vector}
4: for $iter = 1$ to $maxIter$ do
5:    $L(s) \leftarrow L(s) + 1$ {Pump dye from the seed node}
6:    $L \leftarrow \dfrac{L}{\sum L(i)}$ {Normalize dye level vector}
7:    $L \leftarrow \overline{\mathbf{T}} L$ {Distribute dye in network for one iteration}
8: end for
9: output $L$

FIGURE 6B

METHOD AND APPARATUS FOR IDENTIFYING MEMBERS OF A PEER-TO-PEER BOTNET

§1. RELATED APPLICATIONS

This application claims the benefit of U.S. Provisional Patent Application Ser. No. 61/292,887 (incorporated herein by reference and referred to as "the '887 provisional"), filed on Jan. 7, 2010, titled "FRIENDS OF AN ENEMY: IDENTIFYING LOCAL MEMBERS OF PEER-TO-PEER BOTNETS USING MUTUAL CONTACTS" and listing Nasir MEMON and Baris COSKUN as the inventors. The present invention is not limited to requirements of the particular embodiments described in the '887 provisional application.

§2. BACKGROUND OF THE INVENTION

§2.1 Field of the Invention

The present invention concerns network security. More specifically, the present invention concerns finding members of a peer-to-peer botnet.

§2.2 Background Information

A botnet is a network of compromised hosts ("bots") under the control of a "botmaster". Botnets have become a major security threat in recent years. Botnets are used to perform various malicious activities such as spamming, phishing, stealing sensitive information, conducting distributed denial of service ("DDoS") attacks, scanning to find more hosts to compromise, etc. Bots performing such malicious activity occasionally "go over the radar" and get detected by intrusion, anomaly and/or behavior detection systems present within a network. In fact, network administrators routinely discover bots which are then immediately quarantined or removed. Unfortunately, however, the known detection systems don't provide efficient solutions for detecting bots of the same type which haven't been exposed because they might not have committed any malicious activity.

One approach to find dormant bots is to characterize the Command and Control ("C&C") channel from the discovered bot's recent traffic and identify hosts that exhibit similar C&C traffic characteristics. For example, in botnets with a centralized C&C architecture, in which all bots receive commands from a few central control servers, the source of the C&C messages may be used to characterize the corresponding C&C channel and reveal potential dormant bots. (See, e.g., A. Karasaridis, B. Rexroad, and D. Hoeflin, "Wide-scale botnet detection and characterization," *HotBots '07: Proceedings of the first conference on First Workshop on Hot Topics in Understanding Botnets*, (2007), incorporated herein by reference.)

Unfortunately, however, characterizing the C&C channel is generally not a trivial task for botnets that utilize a peer-to-peer ("P2P") architecture without a central server. For example, this kind of source analysis does not work well for P2P botnets because the botmaster in the P2P botnet may use any node to inject C&C messages. To receive and distribute C&C messages, each P2P bot communicates with a small subset of the botnet (i.e., peer list) and maintains its own peer list independently. (See, e.g., the articles: J. B. Grizzard, V. Sharma, C. Nunnery, B. B. Kang, and D. Dagon, "Peer-to-Peer Botnets: Overview and Case Study," *HotBots '07: Proceedings of the First Conference on First Workshop on Hot Topics in Understanding Botnets*, (2007); T. Holz, M. Steiner, F. Dahl, E. Biersack, and F. Freiling, "Measurements and Mitigation of Peer-To-Peer-Based Botnets: A Case Study on Storm Worm," *LEET '08: Proceedings of the 1st Usenix Workshop on Large-Scale Exploits and Emergent Threats*, (2008); and S. Stover, D. Dittrich, J. Hernandez, and S. Dietrich, "Analysis of the Storm and Nugache Trojans: P2P is Here," *Login: The USENIX Magazine*, Volume 32-6 (December 2007), all incorporated herein by reference.) Hence, no obvious common source of C&C messages is observed. Consequently, the discovered bot is not linked with the dormant bots. Furthermore, features based on packet sizes and timings, such as packets per flow, bytes per flow, flows per hour, etc. may not be useful in characterizing a C&C channel, since botmasters may easily randomize such features thereby obtaining different feature values for each bot. (See, e.g., the articles: E. Stinson and J. C. Mitchell, "Towards Systematic Evaluation of the Evadability of Bot/Botnet Detection Methods," *WOOT '08: Proceedings of the 2nd conference on USENIX Workshop on Offensive Technologies*, (2008), incorporated herein by reference.)

Further, characterizing packet contents in botnets such as Nugache, Storm, Waledac and Conficker having advanced encryption mechanisms such as described in, for example, the articles: J. B. Grizzard, V. Sharma, C. Nunnery, B. B. Kang, and D. Dagon, "Peer-to-Peer Botnets: Overview and Case Study," *HotBots '07: Proceedings of the first conference on First Workshop on Hot Topics in Understanding Botnets* (2007); T. Holz, M. Steiner, F. Dahl, E. Biersack, and F. Freiling, "Measurements and Mitigation of Peer-to-Peer-based Botnets: A Case Study on Storm Worm," *LEET '08: Proceedings of the 1st Usenix Workshop on Large-Scale Exploits and Emergent Threats* (2008); P. Porras, H. Saidi, and V. Yegneswaran, "Conficker C P2P Protocol and Implementation," http://mtc.sri.com/Conficker/P2P/ (September 2009); G. Sinclair, C. Nunnery, and B.-H. Kang, "The Waledac Protocol: The How and Why. In Malicious and Unwanted Software (MALWARE)," *4th International Conference*, pp 69-77, (October 2009); and S. Stover, D. Dittrich, J. Hernandez, and S. Dietrich, "Analysis of the Storm And Nugache Trojans: P2P is Here," *Login: The USENIX Magazine*, Volume 32-6 (December 2007) (all incorporated herein by reference.), is not feasible.

In view of the foregoing, it would be useful to provide a scheme, such as identifying local P2P bots of a network before they exhibit any overt behavior, and for even identifying P2P bots which may not exhibit any behavior in common with all other P2P bots.

§3. SUMMARY OF THE INVENTION

Exemplary embodiments consistent with the present invention provide a method and apparatus for discovering a peer-to-peer (P2P) bot in a network using an already discovered P2P bot. More specifically, such embodiments may facilitate identifying a P2P bot of a P2P botnet, by (a) determining a candidate set of P2P bots of the P2P botnet by (i) identifying a set of one or more computers in a network having a plurality of computers, each having a private mutual contact with a computer that has been identified as a "seed" bot, wherein the private mutual contact is external to the network, (ii) identifying an additional set of one or more computers, each having a private mutual contact with the identified set of one or more computers, and (iii) defining the candidate set to include both computers belonging to the identified set and computers belonging to the identified additional set; (b) determining, for each candidate computer in the candidate set, a confidence level indicative of a certainty of a membership of the candidate computer in the P2P botnet; (c) determining, for each candidate computer in the candidate set, whether the confidence level of the candidate computer exceeds a determined threshold confidence level; and (d) identifying at least one of the candidate computers as a P2P bot of the P2P botnet, responsive to a determination that the confidence level of the at least one of the candidate computers exceeds the determined threshold confidence level.

In at least some exemplary embodiments consistent with the present invention, the confidence level is a function of a number of private mutual contacts the candidate computer has with the seed bot and/or with other candidate computers.

In at least some exemplary embodiments consistent with the present invention, the private mutual contact communicates with less than a determined number of computers in the network in a given time interval, the determined number being a privacy threshold (k).

In at least some exemplary embodiments consistent with the present invention, at least two identified candidate computers need not communicate with a same private mutual contact.

In at least some exemplary embodiments consistent with the present invention, the confidence level is determined using an iterative graph traversal method, which is also referred to as dye pumping process. An exemplary dye pumping process determines the confidence level by (a) computing an adjacency matrix A of the private mutual contacts graph G as G=(N,E), where N indicates nodes corresponding to the plurality of computers, and E indicates edges connecting the nodes having private mutual contacts; (b) normalizing the adjacency matrix A; and (c) computing a dye level vector L based on the adjacency matrix A, as L=AL.

In at least some exemplary embodiments consistent with the present invention, the confidence level of the candidate computers is determined using a dye level L(i) in a node i corresponding to a candidate computer in the network.

In at least some exemplary embodiments consistent with the present invention, P2P bots in a network are discovered by (a) determining a candidate set of P2P bots of the P2P botnet by (i) identifying a set of one or more computers in a network having a plurality of computers that have a mutual private behavior with a computer that has been identified as a seed bot, (ii) identifying additional set of one or more computers that have mutual private behaviors with the identified set of one or more computers, and (iii) defining the candidate set to include both computers belonging to the identified set and computers belonging to the identified additional set; (b) determining for each candidate computer in the candidate set, a confidence level indicative of a certainty of a membership of the candidate computer in the P2P botnet; (c) determining for each candidate computer in the candidate set, whether the confidence level of the candidate computer exceeds a determined threshold confidence level; and (d) identifying at least one of the candidate computers as a P2P bot of the P2P botnet, responsive to a determination that the confidence level of the at least one of the candidate computers exceeds the determined threshold confidence level.

§4. BRIEF DESCRIPTION OF THE DRAWINGS

FIGS. 6A and 6B illustrate pseudo code for a dye pumping process, in a manner consistent with the present invention.

§5. DETAILED DESCRIPTION

The present invention may involve novel methods, apparatus, message formats, and/or data structures for finding members of a peer-to-peer botnet using mutual contacts. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§5.1 Exemplary Environment—P2P Botnet

Figure 1:
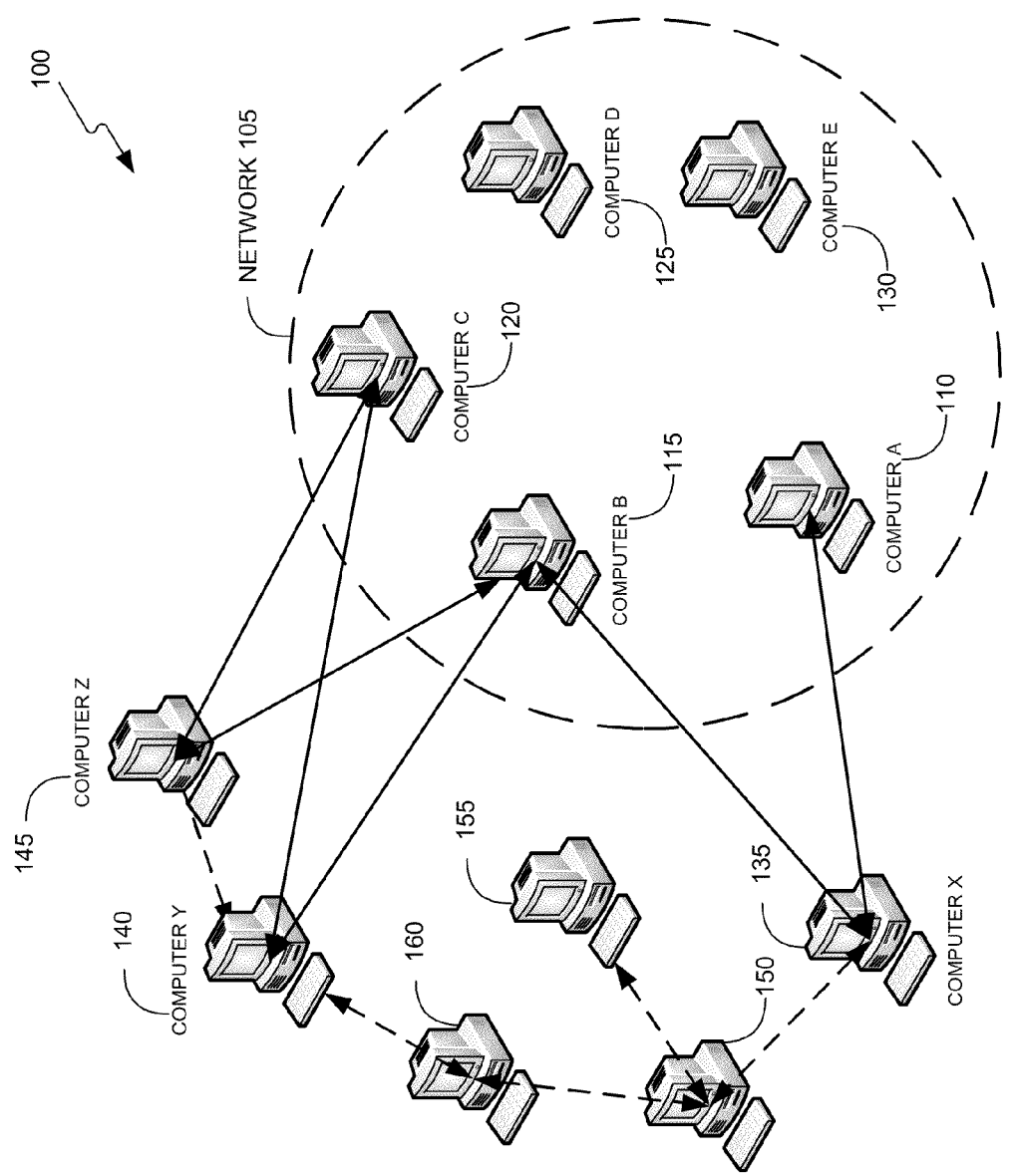
FIG. 1 illustrates an exemplary environment in which exemplary embodiments consistent with the present invention may operate.

FIG. 1 illustrates an exemplary environment 100 in which embodiments consistent with the present invention may operate. As shown, the environment 100 includes a network 105 having devices, such as, for example, computer A 110, computer B 115, computer C 120, computer D 125 and computer E 130. One or more of the computers in the network 105 may communicate with one or more computers outside the network 105. For example, computer A 110 communicates with computer X 135, computer B 115 communicates with computer X 135, computer Y 140 and computer Z 145, and computer C 120 communicates with computer Y 140 and computer Z 145. Communications between the computers in the network 105 and the outside the network 105 may be monitored by a device such as, for example, a network router (not shown).

One of the computers in the network 105 may be a peer-to-peer (P2P) bot of P2P botnet. Generally, the peers of a P2P botnet communicate with other peers in order to receive commands and updates. Although different P2P bots may communicate with different peers, in P2P botnets with an unstructured topology, generally, there is a high probability that any given pair of P2P bots in a network communicate with at least one common external contact (e.g., a computer) during a given time interval. The common external contact is referred to as mutual contact. In other words, there is a significant probability that a pair of P2P bots within network 105 have a mutual contact, which is external to the network 105. For example, in the network 105, assuming that computer A 110, computer B 115, and computer C 120 are P2P bots, then, within a given time interval, computer A 110 and computer B 115 may communicate with a common external bot such as computer X 135, and computer B 115 and computer C 120 may communicate with common external bots such as computer Y 140 and computer Z 145. In other words, computer A 110 and computer B 115 have external computer X 135 as a mutual contact, and computer B 115 and computer C 120 have computer Y 140 and computer Z 145 as two mutual contacts.

The external computers including computer X 135, computer Y 140 and computer Z 145 may be P2P bots of the P2P botnet. In the environment 100, it is assumed that the P2P botnet includes nine computers, namely, computer A 110, computer B 115, computer C 120, computer X 135, computer Y 140 and computer Z 145, and computers 150, 155 and 160. Computer D 125 and computer E 130 in the network 105, which do not communicate with any external bot, may be considered to be benign or uninfected computers (or at least not members of the particular P2P botnet). The P2P botnet shown in environment 100 has an unstructured topology, though this is not necessary.

The computers in the network 105 may include, but are not limited to, a laptop, desktop, a tablet, a router, a mobile phone, or any other device that has computing and networking capabilities. In exemplary environments, the network 105 may include, but is not limited to a local area network ("LAN"), wide area network ("WAN"), and a virtual private network ("VPN").

§5.2 Exemplary Apparatus

Embodiments consistent with the present invention might be implemented in hardware, such as one or more field programmable gate arrays ("FPGA"s), one or more integrated circuits such as an application specific integrated circuit ("ASIC"s), one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.), a laptop, a desktop, a tablet, a mobile phone, or any device that has computing and networking capabilities.

Figure 2:
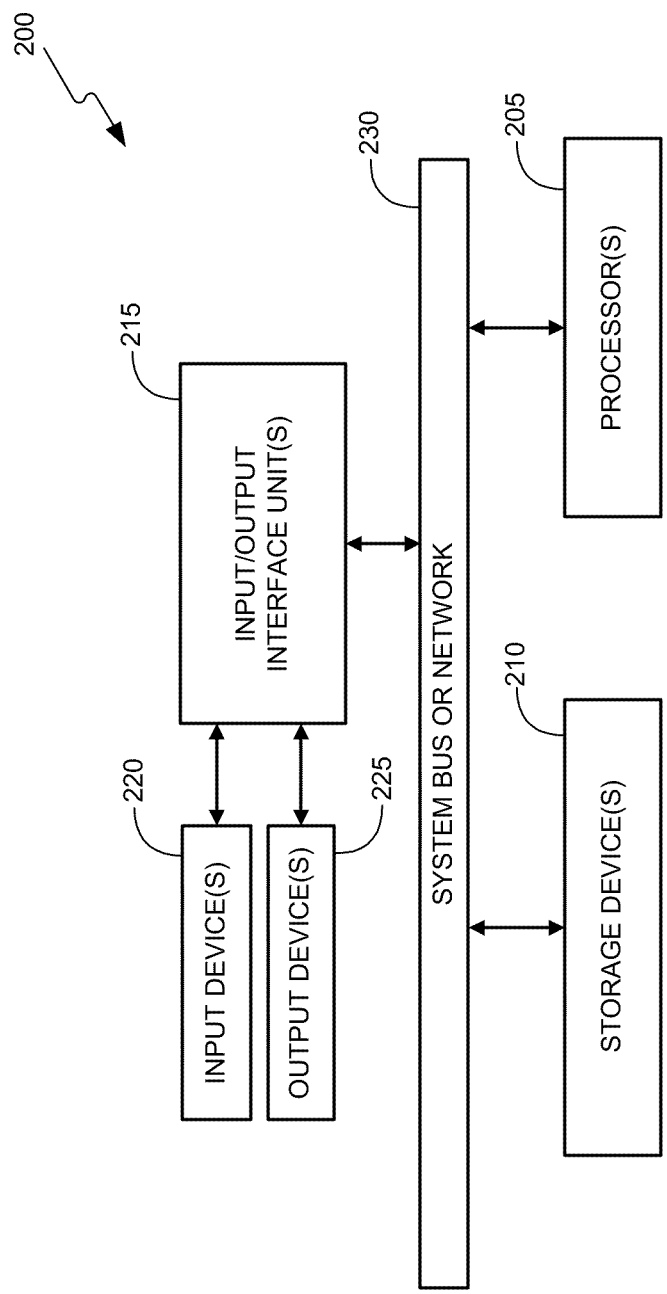
FIG. 2 is a block diagram of an exemplary apparatus that may perform various operations, and store various information generated and/or used by such operations, in a manner consistent with the present invention.

FIG. 2 is a block diagram of an exemplary machine 200 that may perform one or more of the processes described, and/or store information used and/or generated by such processes. The exemplary machine 200 includes one or more processors 205, one or more input/output interface units 215, one or more storage devices 210, and one or more system buses and/or networks 230 for facilitating the communication of information among the coupled elements. One or more input devices 220 and one or more output devices 225 may be coupled with the one or more input/output interfaces 215. The one or more processors 205 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 210 and/or may be received from an external source via one or more input interface units 215.

In some embodiments consistent with the present invention, the processors 205 may be one or more microprocessors. The bus 230 may include a system bus. The storage devices 210 may include system memory, such as read only memory (ROM) and/or random access memory (RAM). The storage devices 210 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

Embodiments of the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

§5.3 Exemplary Methods for Finding P2P Bots of a P2P Botnet

Figure 3:
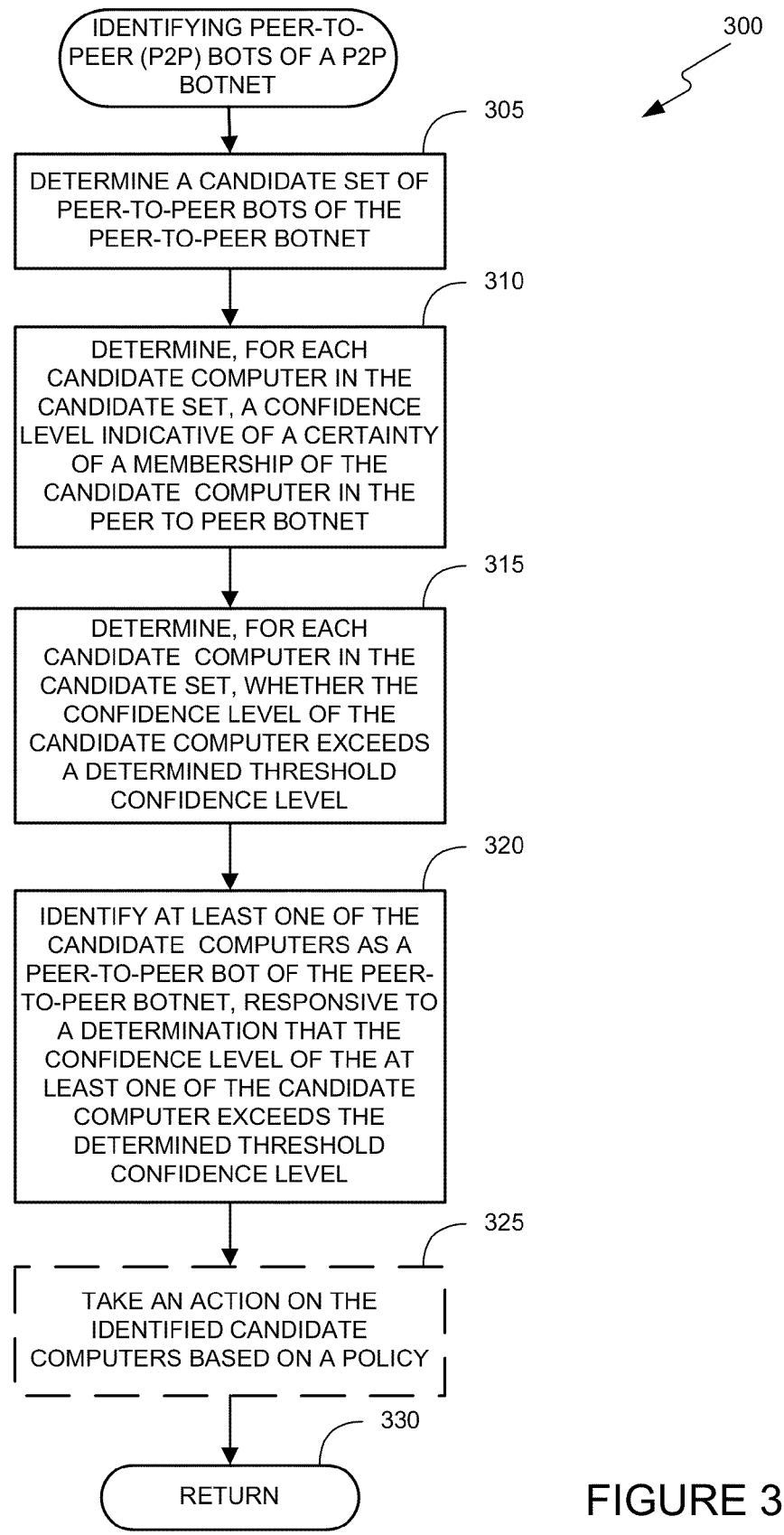
FIG. 3 is a flow diagram of an exemplary method for finding members of a peer-to-peer botnet, in a manner consistent with the present invention.

FIG. 3 is a flow diagram of an exemplary method 300 for finding P2P bots of a P2P botnet in a manner consistent with the present invention. The method 300 may be used in an environment such as the environment 100 described with reference to FIG. 1. At block 305, a candidate set of P2P bots of a P2P botnet are determined. At block 310, for each candidate computer in the candidate set, a confidence level indicative of a certainty of a membership of the candidate computer is determined. At block 315, for each candidate computer in the candidate set, it is determined whether the confidence level of the candidate computer exceeds a determined threshold confidence level. At block 320, responsive to the determination that the confidence level of the candidate computer exceeds the determined threshold confidence level, the candidate computer is identified as a P2P bot of the P2P botnet. At block 325, an action may be taken on the identified P2P bots based on a policy. In an exemplary embodiment consistent with the present invention, the action may include, but is not limited to, further investigating the identified P2P bots by, for example, monitoring network traffic of the identified P2P bots, executing a diagnostic tool on the identified P2P bots or executing other such tools to confirm whether the identified computers are P2P bots.

Figure 4:
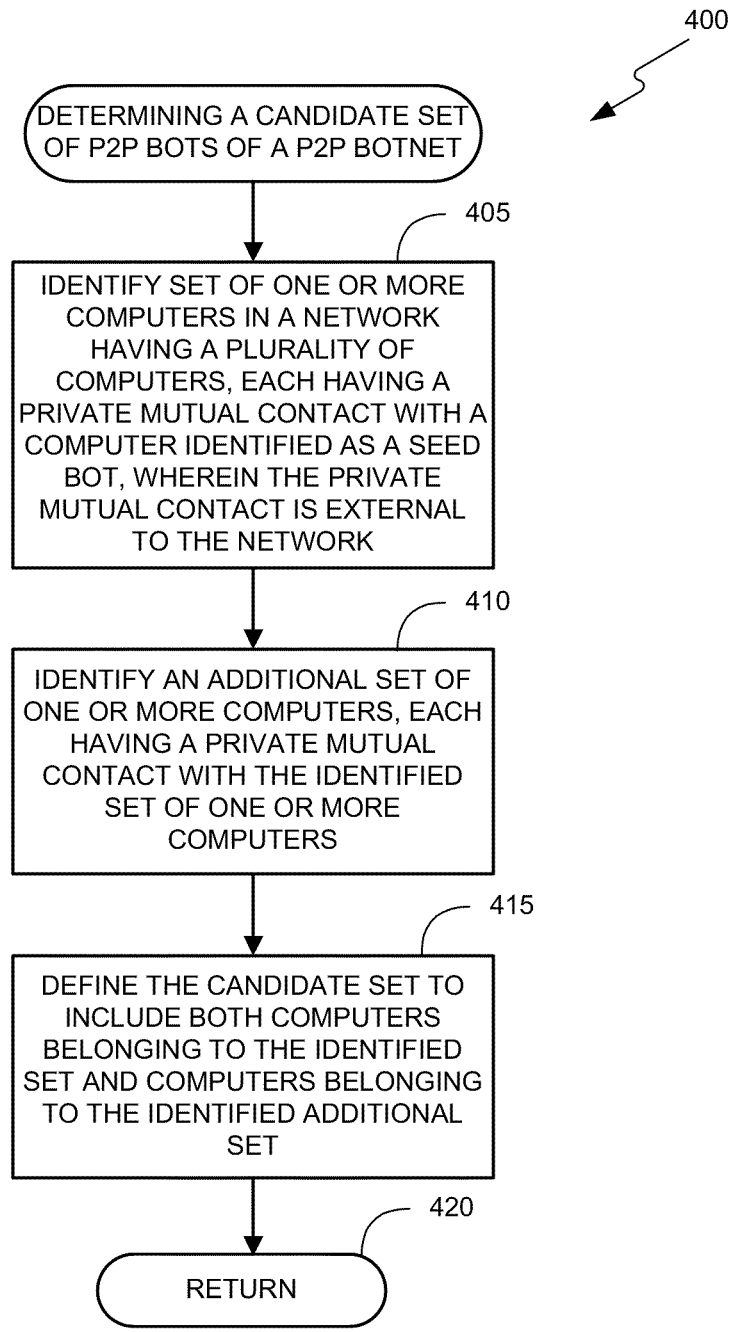
FIG. 4 is a flow diagram of an exemplary method for determining a candidate set of peer-to-peer bots of a peer-to-peer botnet, in a manner consistent with the present invention.

Referring back to block 305, in at least some embodiments consistent with the present invention a candidate set of P2P bots may be determined by exemplary method 400 of FIG. 4. At block 405, a set of one or more computers, in a network, having a private mutual contact with a computer identified as a seed bot are identified. At block 410, an additional set of one or more computers having a private mutual contact with the identified set of one or computers are identified. At block 415, the candidate set is defined to include both computers belonging to the identified set and the identified additional set. At node 420, the method 400 returns to block 310 of method 300.

In an exemplary embodiment consistent with the present invention, the act of identifying additional set of one or more computers having a private mutual contact with the identified set (block 410) is repeated until less than a predetermined number of identified computers are added to the additional set. Alternatively, the act of identifying additional set of one or more computers having a private mutual contact with the identified set (block 410) is repeated for a predetermined number of times.

In an exemplary embodiment consistent with the present invention, a seed bot is a computer known to be (or previously identified as) a P2P bot of the P2P botnet. In an exemplary embodiment consistent with the present invention, the private mutual contact is external to the network. The private mutual contact may include, but is not limited to, a computer, a server, and a router. The private mutual contact is a mutual contact that may communicate with at most a predetermined number of computers in the network in a given time interval. This pre-determined number is defined as a privacy threshold, k. The privacy threshold k may be adjustable. The privacy threshold k may be derived empirically.

Referring back to block 310 of FIG. 3, in an exemplary embodiment consistent with the present invention, the confidence level is a function of a number of private mutual contacts that a candidate computer has with the seed bot or other computers. Referring back to block 315, the threshold confidence level may be adjustable and it may be derived empirically. In an exemplary embodiment consistent with the present invention, the confidence level of the candidate computer in the candidate set may be computed using a dye-pumping process.

In an exemplary embodiment consistent with the present invention, the private mutual contact and the candidate computers in the candidate set are identified using the network flow data recorded by a router of the network. More specifically, the source and destination Internet Protocol ("IP") addresses in the network data are examined to identify the candidate computers and the private mutual contact.

In an exemplary embodiment consistent with the present invention, the basic idea of the methods 300 and 400, in the context of exemplary environment 100 is that, computer A 110 may be linked to computer B 115 since they both communicate with, for example, computer X 135 (the private mutual contact). Similarly, computer B 115 may be linked to computer C 120 since they both communicate with, for example, computer Y 140 and computer Z 145. As a result, if computer A is known to be a member of a P2P botnet (is a seed bot), then by examining its connections, it may be suspected that computer B 115 is likely to be a member of the P2P botnet due to the presence of a private mutual contact with the known bot, computer A 110. Similarly, if computer B 115 is identified as a likely member of the P2P botnet, then computer C 120 is likely to be a member as well.

Further, in an exemplary embodiment consistent with the present invention, at least two identified candidate computers need not communicate with a same private mutual contact. For example, the two identified candidate computers, computer A 110 and computer C 120 need not communicate with the same private mutual contact such as computer X 135.

§5.3.1 Finding P2P Bots Using Dye Pumping Process

Figure 5:
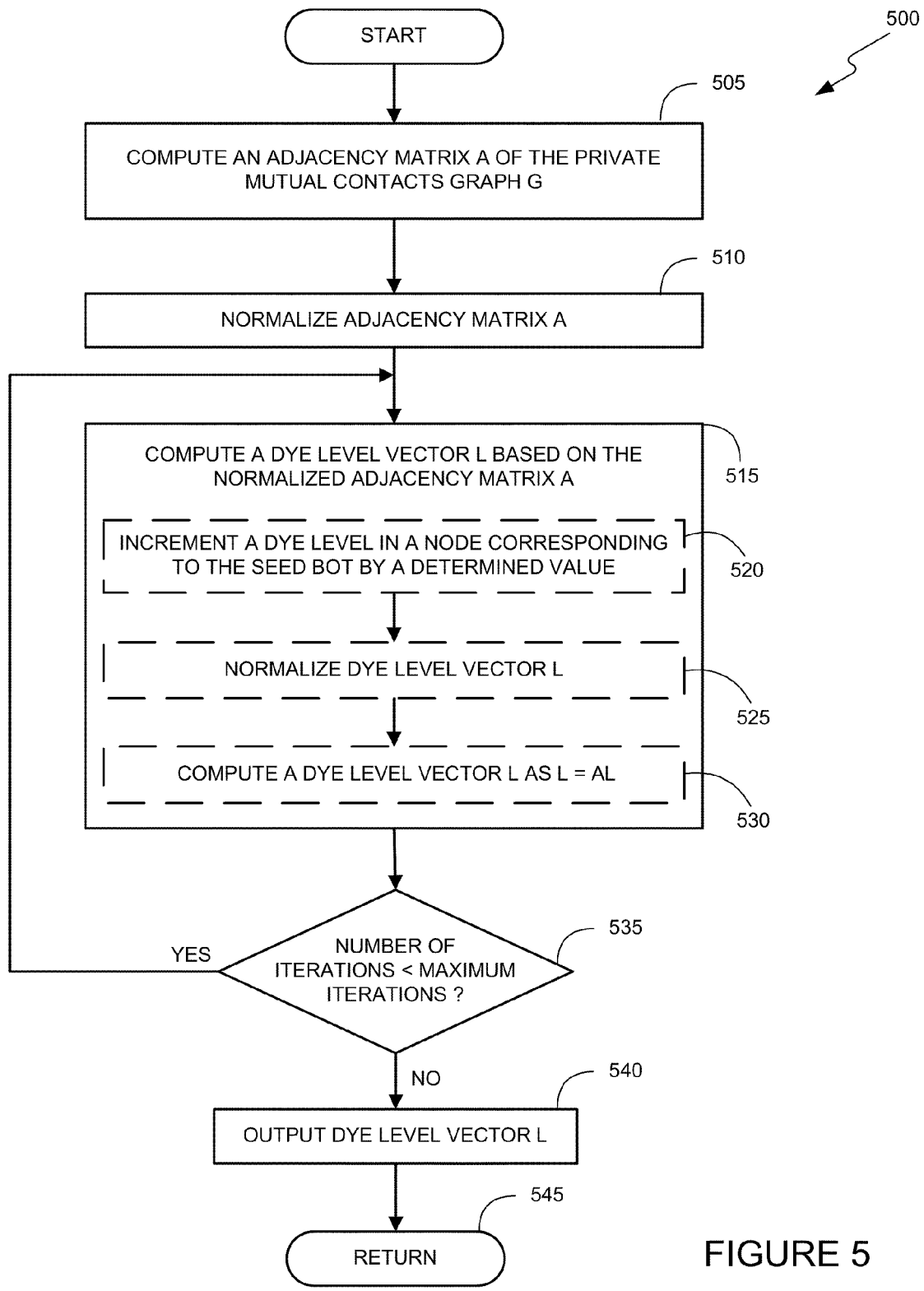
FIG. 5 is a flow diagram of an exemplary method for finding members of a peer-to-peer botnet using a dye pumping process, in a manner consistent with the present invention.

FIG. 5 is a flow diagram of an exemplary method 500 for finding members of a peer-to-peer botnet using a dye pumping process, in a manner consistent with the present invention. More specifically, the dye pumping process 500 computes a dye level vector that is indicative of a confidence level of a candidate computer being a member of P2P botnet. The dye-pumping process is based on an observation that the members of a P2P botnet tend to have several private mutual contacts between each other. Hence, the members of the P2P botnet are likely to be connected with the seed bot through "short" and "high" capacity paths on a private mutual-contacts graph (as described below). Therefore, when a dye is pumped into a private mutual-contacts graph from the seed node, and the dye coming to a node is distributed across its outgoing edges in proportion to the edge capacities, and after several iterations of dye pumping, the nodes, which are likely to be a member of the same P2P botnet as the seed node may accumulate more dye than other nodes. The dye pumping process iteratively pumps dye to the private mutual contacts graph from the seed bot and then identifies the node(s) which accumulates more dye than a threshold confidence level as members or potential members of the P2P botnet.

To begin with, the dye pumping process 500 assumes that the candidate set of computers and the private mutual contacts are identified (Recall, for example, block 305 in FIG. 3). At block 505, an adjacency matrix A of private mutual contacts graph G is computed. In an exemplary embodiment consistent with the present invention, the private mutual contacts graph G is computed as follows:

$$G=(N,E) \quad (1)$$

where
  N indicates nodes corresponding to the plurality of computers in the network, and
  E indicates edges connecting the nodes having private mutual contacts.

In such an exemplary embodiment consistent with the present invention, the adjacency matrix A may be computed as:

$$A(i,j)=C_p(E_{ij}), \quad (2)$$

where
  A is a matrix of size v*v,
  v is a number of nodes in the private mutual contacts graph G, and
  $C_p(E_{ij})$ is an edge capacity of an edge connecting nodes i and j in graph G. In such an exemplary embodiment consistent with the present invention, the edge capacity is indicative of a number of private mutual contacts between a pair of nodes connected by an edge.

At block 510, the adjacency matrix A is normalized. At block 515, a dye level vector L is computed based on the normalized adjacency matrix A. Further, in an exemplary embodiment consistent with the present invention, the act of computing of the dye level vector L, at block 515, may include the acts illustrated by blocks 520, 525 and 530. More specifically, at block 520, the dye level in a node corresponding to the seed bot is incremented by a determined value. At block 525, the dye level vector L is normalized. In an embodiment consistent with the present invention, the dye level vector L is normalized as follows:

$$L=L/\Sigma_{i=1}^{v} L(i) \quad (3)$$

where
  v is a number of nodes in the private mutual contacts graph,
  L is a vector of size 1*v, and
  L(i) is a dye level at a node i.

At block 530, the dye level vector L is computed. In the exemplary embodiment consistent with the present invention, the dye level vector L may be computed as follows:

$$L(i)=\Sigma_{j=1}^{v} A(j,i)L(j) \quad (4)$$

After computing the dye level vector L, the exemplary method 500 proceeds to block 535, where it is determined if the dye level vector L is computed a determined number of times. If the dye level vector L is not computed a determined number of times, then the control returns to block 515 and the computation is repeated. On the other hand, if the dye level vector L is computed a determined number of times, the dye level vector L is output as illustrated at block 540. Note that computing the dye level vector should be broadly understood to include updating a previously determined dye level vector at each iteration.

After the dye level vector is output, the exemplary method returns at node 545. In an exemplary embodiment consistent with the invention, the value L(i) in the dye level vector L indicates a confidence level of the candidate computer corresponding to node i. In such an exemplary embodiment consistent with the present invention, the dye level L(i) at node i is proportional to the edge capacities of the edges connecting node i with other nodes.

FIGS. 6A and 6B illustrate pseudo code for a dye pumping process, in a manner consistent with the present invention.

§5.3.2 Alternatives, Refinements and Extensions

Although the exemplary dye pumping process explained above determines the adjacency matrix and dye level vector as described above, they may be determined differently. For example, in another exemplary embodiment consistent with the present invention, the dye pumping process may compute the dye level vector L using a dye attraction coefficient. The dye attraction coefficient indicates what portion of the dye arriving at node j may be distributed to node i in the next iteration. It represents a confidence level of node i being a P2P bot given that node j is a P2P bot. Such confidence gets higher as node i and node j share more private mutual contacts with each other. On the other hand, the confidence level decreases if node i shares mutual-contacts with many other nodes in the private mutual contacts graph G. The reason is that the number of bots in the network are expected to be a few and therefore if a host shares mutual-contacts with many other hosts, then these mutual contacts are probably due to a different legitimate application other than bots. Consequently, the dye-attraction coefficient ($\gamma_{ji}$) from node j to node i may be computed as follows:

$$\gamma_{ji}=C_p(E_{ij})/(D_i)^\beta \quad (5)$$

where
  $C_p(E_{ij})$ is an edge capacity of an edge connecting nodes i and j;
  $D_i$ is a degree of node i indicating a number of edges a node i has, and
  $\beta$ is a node degree sensitivity coefficient.

The dye attraction coefficient, $\gamma_{ji}$, may further be used in computing the adjacency matrix A (for example, at block 505 of the dye pumping process 500 illustrated in FIG. 5). The adjacency matrix A may be computed using the dye attraction coefficient as follows:

$$A(i,j)=\gamma_{ji}, \quad (6)$$

Although, the exemplary embodiments explained above find members of a P2P botnet based on private mutual contacts between the computers in the network, the members may be found using one or more other factors instead of, or in addition to, private mutual contacts. For example, in another exemplary embodiment consistent with the present invention, the members of the P2P botnet may be found based on mutual private behaviors of the computers in the network. One method of finding P2P bots in a P2P botnet based on mutual private behavior is as follows:

(a) determine a candidate set of P2P bots of the P2P botnet by
   (i) identify a set of one or more computers in a network having a plurality of computers that have a mutual private behavior with a computer that has been identified as a seed bot,
   (ii) identify additional set of one or more computers that have mutual private behaviors with the identified set of one or more computers, and
   (iii) define the candidate set to include both computers belonging to the identified set and computers belonging to the identified additional set
(b) determine, for each candidate computer in the candidate set, a confidence level indicative of a certainty of a membership of the candidate computer in the P2P botnet;
(c) determine, for each candidate computer in the candidate set, whether the confidence level of the candidate computer exceeds a determined threshold confidence level; and
(d) identify at least one of the candidate computers as a P2P bot of the P2P botnet, responsive to a determination that the confidence level of the at least one of the candidate computers exceeds the determined threshold confidence level. The confidence level is a function of the mutual private behaviors a candidate computer has with a seed bot and/or other computers.

In an exemplary embodiment consistent with the present invention, the mutual private behavior between a pair of computers may include, but is not limited to, communications with one ore more common external computers (perhaps excluding external computers commonly contacted by many other non-compromised computers or some other behavior that is otherwise apparently legitimate), visiting similar domain names, exhibiting network flows which have similar packet characteristics (like timing, size, etc), sending similar instant messages, and posting similar content on social networking sites or blogs. This advantageously allows the detection of a bot before it exhibits malicious behavior (i.e., a bot that is latent). However, "mutual private behavior" should not be interpreted to exclude apparently malicious behavior such as sending spam electronic mails (emails), phishing, conducting distributed denial of service ("DDoS") attacks and scanning to find more hosts to compromise. In an exemplary embodiment consistent with the present invention, at least two identified candidate computers need not share identical mutual private behaviors with other identified candidate computers. For example, in the context of exemplary environment 100, computer A 110 (which is a known seed bot) may exhibit a behavior of sending spam emails, computer B 115 may exhibit a behavior including sending spam emails and phishing, and computer C 120 may exhibit a behavior of phishing and DDoS attacks. Since computer A 110 (which is assumed to be a seed bot) and computer B 115 exhibit a mutual behavior of sending spam emails, it may concluded that computer B 115 is a potential P2P bot. Since computer B 115, which is identified as a potential bot, and computer C 120 exhibit a mutual behavior of phishing, computer C 120 may also be identified as a potential P2P bot. Therefore, computer B 115 and computer C 120 are identified as candidate computers. Finally, the P2P bots are identified after computing a confidence level of the candidate computers. Note that computer A 110 and computer C 120 do not exhibit any similar mutual behavior (other than sharing mutual behaviors with computer B 115).

§5.4 Illustrative Examples of Operation

Figure 7:
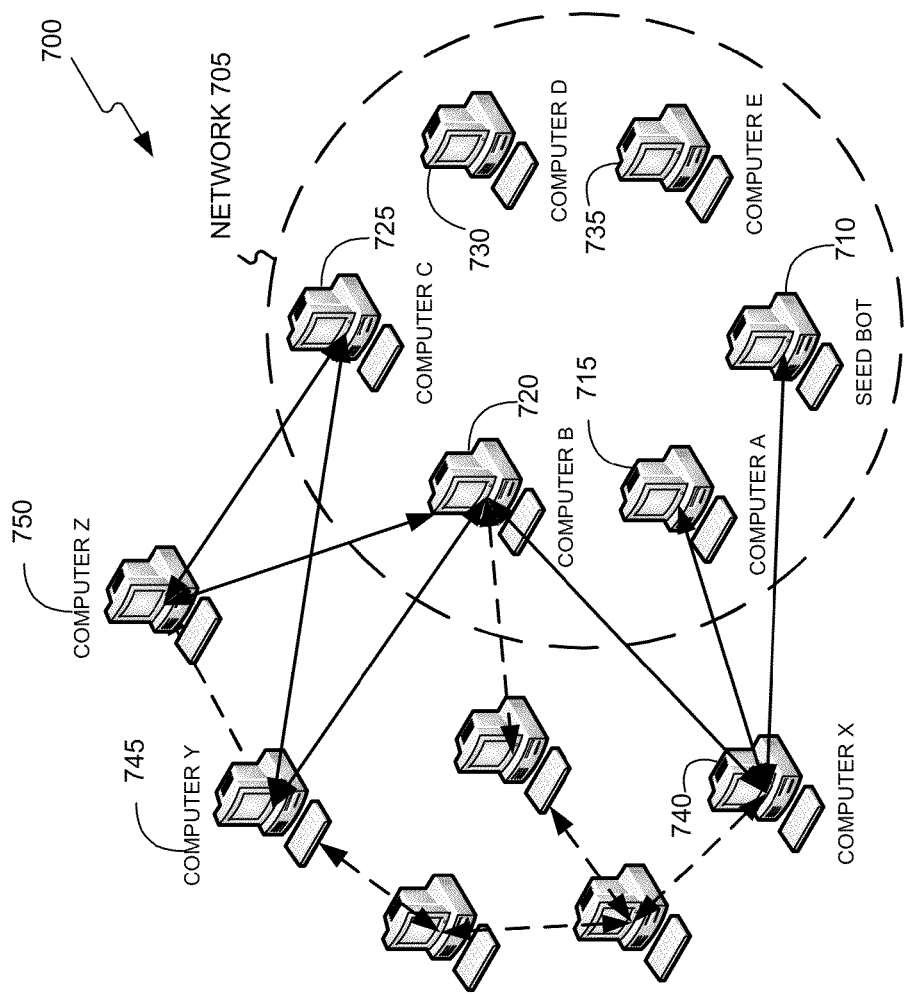
FIG. 7 illustrates an exemplary network in which an exemplary dye pumping process may be used to find peer-to-peer bots, in a manner consistent with the present invention.

An example illustrating an exemplary method of finding the members of a P2P botnet and the dye pumping process is now described with reference to FIGS. 7 and 8. As shown in FIG. 7, environment 700 includes a network 705 having seed bot 710, computer A 715, computer B 720, computer C 725, computer D 730 and computer E 735. The computers in the network 705 communicate with external computers such as, for example, computer X 740, computer Y 745, and computer Z 750. In this example, assume that seed bot 710 is known to be a member (P2P bot) of a P2P botnet. Now, a candidate set of P2P bots in the network 705 are determined by identifying computers that have a private mutual contact with seed bot 710. (Recall 305 of FIG. 3 and 355 of FIG. 4.) Computer A 715 and computer B 720 have a private mutual contact, for example, computer X 740 with the seed bot 710. Therefore, computer A 715 and computer B 720 are identified as candidate computers. Now, additional computers that share a private mutual contact with the identified candidate computers, computer A 715 and/or computer B 720, are identified. (Recall 410 of FIG. 4.) Computer C 725 that has two private mutual contacts, computer Y 745 and computer Z 750 with computer B 720 is identified as an additional computer. The above process of identifying additional computers is repeated until less than a predetermined number of computers can be identified. The identified candidate computers and the additional candidate computers form the candidate set. (Recall 415 of FIG. 4.) The candidate set includes computers that could potentially be P2P bots. Computer D 730 and computer E 735 are not included in the candidate set since they do not have any private mutual contacts with the seed bot 710 or other candidate computers. Therefore, computer D 730 and computer E 735 are not identified as members (or potential members) of the P2P botnet.

Further, a confidence level of the each of the candidate computers in the candidate set (computer A 715, computer B 720, and computer C 725) is determined. (Recall 310 of FIG. 3.) If the confidence level of any of candidate computers is determined to exceed a determined threshold confidence level, then the candidate computers are identified as P2P bots of the P2P botnet. (Recall 315 and 320 of FIG. 3.) The threshold confidence level may be derived empirically and may be adjustable.

Figure 8:
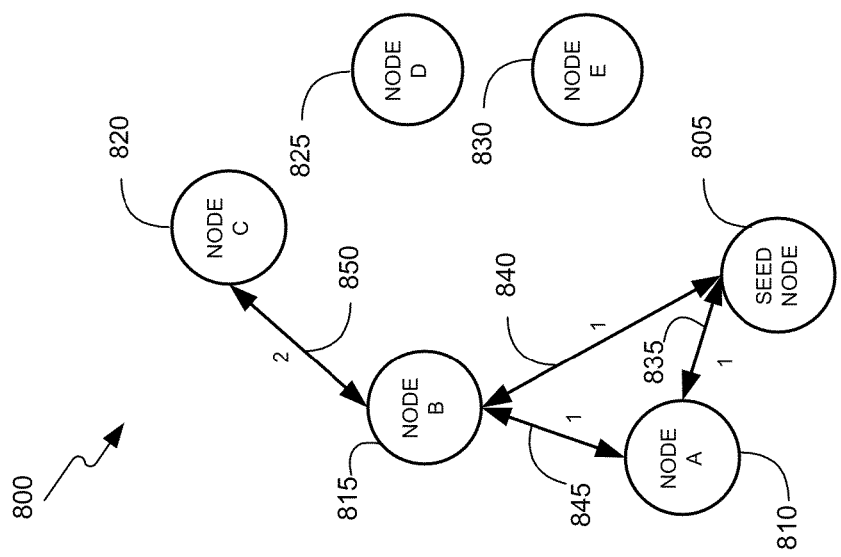
FIG. 8 illustrates a private mutual contacts graph of the network of FIG. 7.

Referring now to FIG. 8, the dye pumping process for determining the confidence level of the above identified candidate computers is described. FIG. 8 illustrates a private mutual contacts graph G 800 of the computers in the network 705. The nodes seed node 805, node A 810, node B 815, node C 820, node D 825, and node E 830 in the private mutual contacts graph 800 correspond to the computers, seed bot 710, computer A 715, computer B 720, computer C 725, computer D 730 and computer E 735 in network 705 respectively. (Recall section 5.3.1 above.) Some of the nodes in the graph 800 are connected by edges 835, 840, 845 and 850. Each edge in the graph G 800 has an edge capacity which is determined by the exact number of private mutual contacts between corresponding computers. More formally, if $C_p(E_{ij})$ represents the capacity of the edge between nodes $N_i$ and $N_j$, then $$C_p(E_{ij})=C_p(E_{ji})=|S(N_i) \cap S(N_j)| \qquad (7)$$

where $S(N_i)$ represents the set of private mutual contacts which $N_i$ was in communication with during a given time interval and $|\cdot|$ represents the cardinality of a set. The edge 835 with an edge capacity of 1 indicates that the seed node 805 and node A 810 have one private mutual contact (computer X 740 in FIG. 7). Similarly, edge 840 with an edge capacity of 1 indicates that the seed node 805 and node B 815 have one private mutual contact (computer X 740 in FIG. 7). Similarly, edge 845 with an edge capacity of 1 indicates that the node A 810 and node B 815 have one private mutual contact (computer X 740 in FIG. 7). Similarly, edge 850 with an edge capacity of 2 indicates that the node B 815 and node C 820 have two private mutual contacts (computer Y 745 and computer Z 750 in FIG. 7). Each of the nodes, node D 825 and node E 830 are not connected to any other nodes since they do not have any private mutual contacts with the seed node 805 or other nodes in the private mutual contacts graph G 800.

The dye pumping process starts by computing an adjacency matrix A of the private mutual contacts graph G 800. (Recall 505 of FIG. 5.) The adjacency matrix may be computed using the formula, for example, (2) or (6) described in section 5.3.1 above. Then the dye pumping process normalizes the adjacency matrix A so that each of its columns sums to 1. (Recall 510 of FIG. 5.) After normalization, the dye pumping process iteratively pumps dye in the private mutual-contacts graph G 800 starting from the seed node 805. For this purpose, the dye level vector L, where L(i) indicates the dye level accumulated at node i is initialized to zero. The process begins with filling the seed node 805 with dye, that is, by incrementing the dye level in the seed node 805 by a pre determined value (Recall 520 of FIG. 5.) and leaving the other nodes empty such that: L(i)=1, if s=i and 0, elsewhere. Following that, the dye level vector L is normalized. (Recall 525 of FIG. 5.) Once the seed node 805 is filled with dye, the dye is pumped from the seed node across the private mutual-contacts graph G 800 to other nodes. The dye flows from seed node 805 to node A 810 and node B 815, from node A 810 to node B 815, and from node B 815 to node C 820. Since the outgoing edges distribute the dye accumulated within a node proportional to their edge capacities, the dye levels at each node may be computed using the formula (4) described above. (Recall 530 of FIG. 5.) The above process of pumping the dye from the seed node 805 is repeated a determined number of times (Recall 535 of FIG. 5.) and finally, the dye-level vector L having the dye level values L(i), indicative of a confidence level of each of the candidate computers in the candidate set, is output. (Recall 540 of FIG. 5.)

§5.5 Simulation Based Performance Evaluation

In this section, the setup and results of the experiments conducted in order to demonstrate the efficacy of the proposed method are explained. First, a HypoBotnet (a hypothetical botnet) was used and then real P2P botnet traces were employed in order to see how the proposed method performs against real P2P botnets for different botnet sizes and different number of contacted peers.

First, the probability of having an edge between members of a P2P botnet on a private mutual-contacts graph is investigated. This probability is called the bot-edge probability and is denoted by $p_e$. Then, the expected edge capacities between P2P bots are investigated. To study the bot-edge properties for different botnets, a hypothetical P2P botnet traffic was generated. Using hypothetical botnet traces, the mutual-contact probabilities for various botnet sizes and various peer communication densities were explored. Also, the botedge probabilities and expected edge capacities for real P2P botnets, namely Waledac, Storm and Nugache were estimated. Finally, in order to further understand why the dye pumping process works, the structure and dynamics of subgraphs formed by the P2P bots on a private mutual-contacts graph are investigated.

There are various mechanisms for a P2P bot to bootstrap and find other peers. For instance Storm botnet uses a variant of Kademlia (See, for e.g., the article: Petar Maymounkov and David Mazières, "Kademlia: A Peer-to-Peer Information System Based on the XOR Metric", 1st International Workshop on Peer-to-peer Systems (IPTPS '02)) based Overnet protocol (See, for e.g., the article: http://en.wikipedia.org/wiki/Overnet). As a result of such mechanisms, some peers might have a higher probability of being selected by other peers (See, for e.g., the article: Davis C., Neville S., Fernandez J. M., Robert J.-M., McHugh J., "Structured Peer-to-Peer Overlay Networks Ideal Botnets Command and Control Infrastructure?", Proceedings of 13th European Symposium on Research in Computer Security (ESORICS), Malaga, Spain, 461-480, (October 2008)). Obviously, having such preferred peers in a P2P botnet increase the chance of finding private mutual-contacts between P2P bots in a network. However, in the worst case from our experiment's point of view, one can imagine that there is no preferred peer in the botnet and all the peers have equal probability of being contacted by any other peer, thereby minimizing the probability of private mutual-contacts between peers.

§5.5.1 HypoBotnet: A Hypothetical Generic P2P Botnet

To investigate the probability of private mutual-contacts in the worst case, the HypoBotnet is investigated. HypoBotnet has two configurable parameters such that it is composed of B peers overall and each peer of HypoBotnet communicates with C other peers randomly selected with uniform probability during a specific observation window. Based on these parameters, the probability of a Hypobotnet peer being contacted by a pair of given peers can be computed as $$\left(\frac{C}{B}\right)^2.$$

By definition, the bot-edge probability for Hypobotnet is equal to the probability of finding at least one private mutual-contacts between any given pair of peers. Therefore, bot-edge probability of Hypobotnet can be approximated as:

$$p_{e\_HypoBotnet} \approx 1 - \left[1 - \left(\frac{C}{B}\right)^2\right]^B \quad (8)$$

Figure 9:
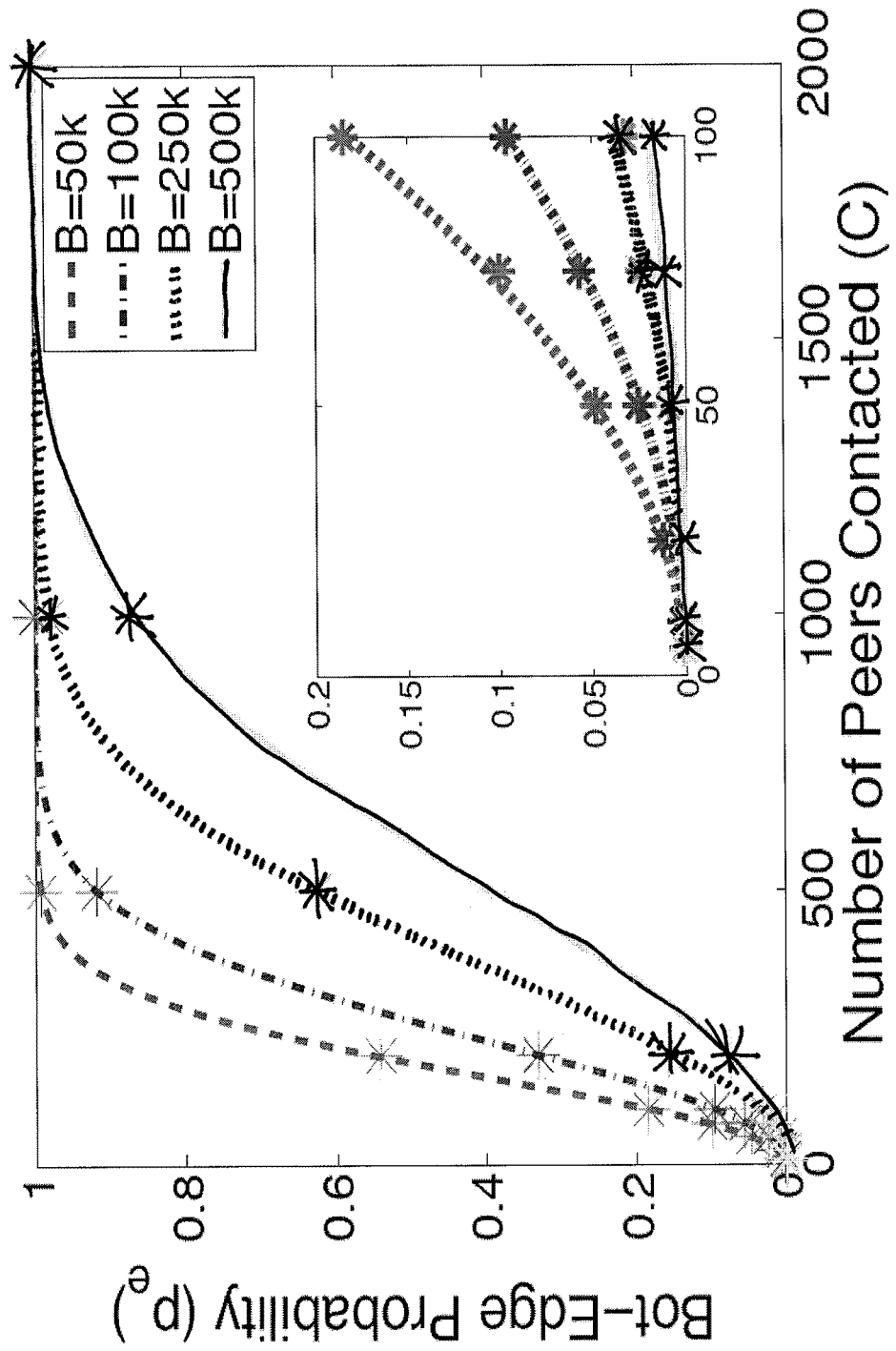
FIG. 9 illustrates bot edge probabilities for different botnet sizes and different numbers of contacted peers, in an exemplary simulated system consistent with the present invention.

FIG. 9 depicts bot-edge probabilities of a HypoBotnet for different botnet sizes (B) and different numbers of contacted peers (C). The inner figure magnifies the region 0<C<100. It is observed that, similar to a birthday paradox, as the number of contacted peers increases, the bot-edge probability increases very rapidly. Consequently, even for a very large botnet with 500 k peers, the bot-edge probability is almost 1 when peers contact with only 1000 other peers during the observation window.

Although high bot-edge probabilities works in favor of the dye pumping process, the capacities of those edges are also important. It is obvious that, the higher the bot-edge capacities the better the dye-pumping algorithm performs. For Hypobotnet, the probability of a peer contacted by two given peers is $$\left(\frac{C}{B}\right)^2.$$

Therefore, since there are B peers in total, the expected capacity of bot edges, $(E[C_p])$, is approximated as:

$$E[C_p]_{HypoBotnet} = \left(\frac{C}{B}\right)^2 B = \left(\frac{C}{B}\right)^2 \quad (9)$$

Figure 10:
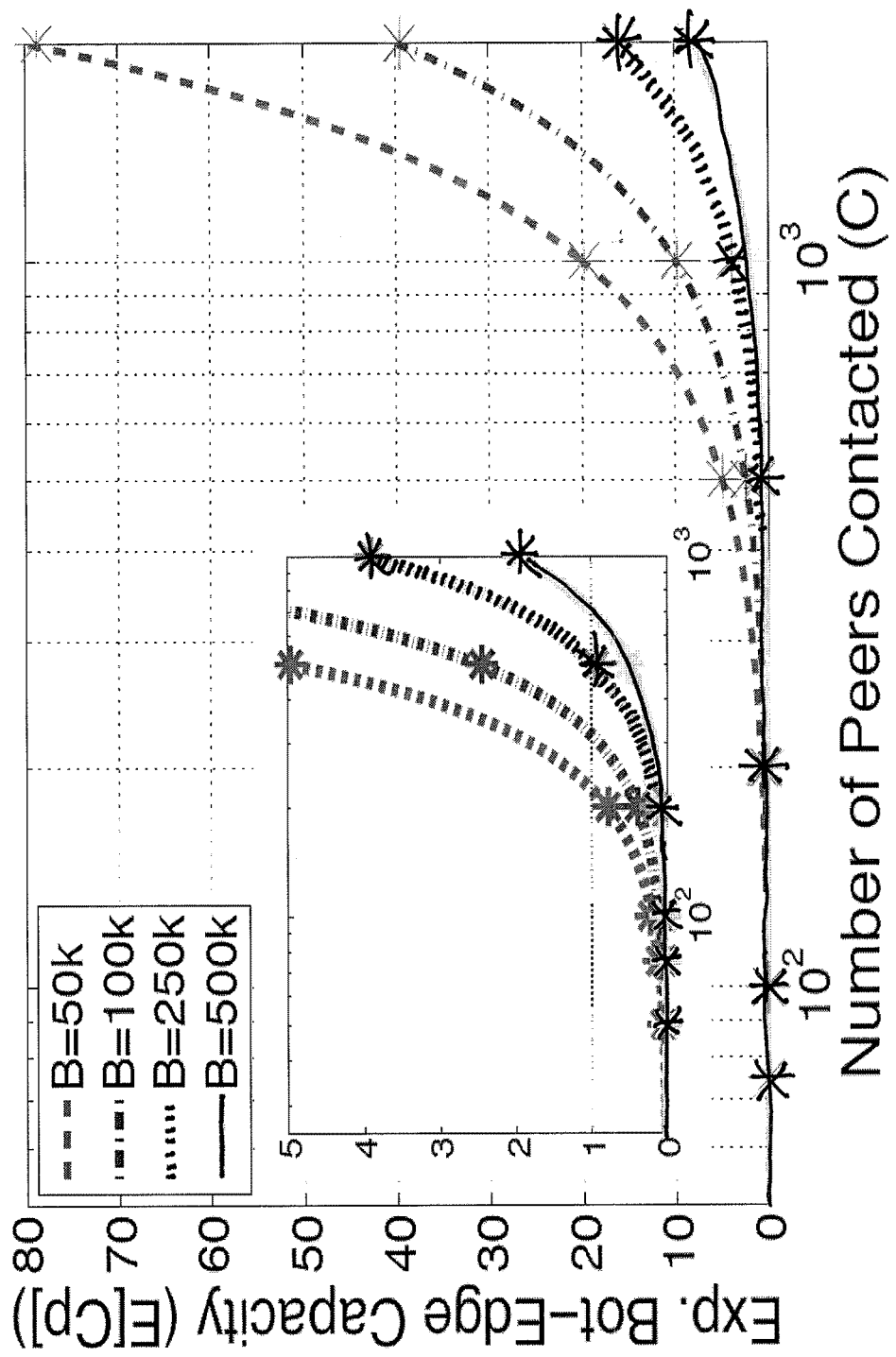
FIG. 10 illustrates expected value of bot edge capacity for different botnet sizes and different numbers of contacted peers, in an exemplary simulated system consistent with the present invention.

FIG. 10 depicts the expected bot-edge capacities for different botnet sizes (B) and different numbers of contacted peers (C). It is observed that, regardless of the botnet size, expected bot-edge capacity rapidly exceeds 1 and continues to increase as the number of contacted peers increases. Both FIGS. 9 and 10 suggest that the members of a P2P botnet will most probably be well connected with each other on a private mutual-contacts graph through high capacity edges, thereby allowing the dye pumping algorithm to identify them. This analysis is further validated with experiments described below.

Real P2P Botnets

It is important to measure the bot-edge probabilities and expected bot edge capacities of real world botnets in order to see whether the proposed method works for real P2P botnets. One way to estimate these values is to infect two hosts in a network with a real P2P botnet and count the number of private mutual-contacts they exhibit during the observation window. For this purpose, two hosts which were isolated from the rest of our network by a firewall were infected. The firewall was also set to block all SMTP traffic to prevent the infected hosts from sending spam. Other traffic was allowed since we wanted the infected hosts to communicate with other peers. The observation window was set to 24 hours and the privacy threshold (k) to 5. With this technique, the bot-edge probability and edge capacity for the Storm botnet (See, for e.g., the article: T. Holz, M. Steiner, F. Dahl, E. Biersack, and F. Freiling, "Measurements and Mitigation of Peer-to-Peer-Based Botnets: A Case Study on StormWorm", *LEET '08: Proceedings of the 1st Usenix Workshop on Large-Scale Exploits and Emergent Threats*, 2008) and the more recent Waledac botnet were measured. Waledac uses TCP port 80 to blend in the busy HTTP traffic. More details can be found in the articles: B. Stock, J. Gobel, M. Engelberth, F. C. Freiling, T. Holz, "Walowdac—Analysis of a Peer-to-Peer Botnet", *Computer Network Defense (EC2ND), European Conference*, (2009); and Dae-il Jong, Minsoo Kim, Hyun-chul Jung, Bong-Nam Noh, "Analysis of HTTP2P Botnet: Case Study Waledac", *Communications (MICC), IEEE 9th Malaysia International Conference*, (2009).

For both botnets, two different binaries having different MD5 values were used to infect each machine in the hope of avoiding trivial mutual contacts that may have been hard coded in the botnet binaries.

TABLE 1

|  | Day 1 | | Day 1 | | Day 3 | |
|---|---|---|---|---|---|---|
| P2P Botnet | Δ | ○ | Δ | ○ | Δ | ○ |
| Storm | 5180 | 2861 | 4681 | 2886 | 4022 | 2323 |
| Waledac | 1145 | 341 | 775 | 300 | 1012 | 358 |

Δ: Average number of unique IP addresses that a bot communicates with each day.
○: the number of mutual-contacts (the bot-edge capacities) between the two bots during 24 hours.

Table 1 shows a summary of observed P2P botnet behavior for Storm and Waledac botnets. For both botnets, it was observed that the infected hosts communicated with several new unique external IP addresses each day. All of these external IP addresses were private contacts such that they were in communication with less than k=5 internal hosts. As expected, many of these external IP addresses communicated with both of the infected hosts and no other host in the network, thereby becoming a private mutual-contact. It is observed from Table 1 that the infected hosts were connected with high capacity edges on private mutual-contacts graph for both Storm and Waledac botnets. Since several private mutual-contacts were observed each day, it can be said that the bot-edge probabilities of both botnets are equal to 1 (i.e. $p_{e\_Storm} = p_{e\_Waledac} = 1$). Notice that, these values are much higher than a comparable Hypobotnet. That is, the expected bot-edge capacity of the HypoBotnet with 50 k peers is only 20 even though each of it's peer communicates with 1000 other peers (see FIG. 7). Hence, one can suspect that peers of Storm and Waledac don't select other peers to communicate with uniformly at random due to various possible reasons. In conclusion, we expect that the proposed method performs much better on the real world P2P botnets than a comparable HypoBotnet.

Friends Stay Close: Erd"os-Rényi Subgraphs

In the previous subsections the bot-edge probabilities on a private mutual-contacts graph for different P2P botnets was investigated. Here, however, the dye pumping process identifies the P2P bots which are connected to the seed node through a short path on a private mutual-contacts graph. Hence, in order for the dye pumping algorithm to identify all P2P bots in a network, the subgraph they form on the private mutual-contacts graph has to be connected. In this subsection, given a bot-edge probability, how the P2P bots are oriented on a private mutual contacts graph are investigated and what portion of the P2P nodes can be accessed by the dye pumping process.

To understand the structure of the subgraph formed by members of a P2P botnet on a private mutual-contacts graph, assume that there are m hosts in the network, and therefore the corresponding m nodes on the graph, which are members of the HypoBotnet. Let the set $X = \{X_1, X_2, \ldots, X_m\}$ denote these nodes and $p_{e\_HypoBotnet}$ denote the probability of having an edge between any given $X_i$ and $X_j$, for $i \neq j$ where $1 \leq i \leq m$ and $1 \leq j \leq m$. Since $p_{e\_HypoBotnet}$ is the same for any pair of $X_i$ and $X_j$, the subgraph formed by the nodes $X_1, X_2, \ldots, X_m$ on a private mutual-contacts graph is an Erd"os-Rényi random graph (See, for example, P. Erdos and A. Renyi, "On random graphs," *Publ. Math. Debrecen* 6, pages 290-297, (1959); and P. Erdos and A. Renyi, "The evolution of random graphs," *Magyar Tud. Akad. Mat. Kutato Int. Kozl* 5, pages 17-61, (1960)), where each possible edge in the graph appears with equal probability.

One interesting property shown by Erd"os and Rényi is that, Erd"os-Rényi graphs have a sharp threshold of edge-probability for graph connectivity. (See, for example, P. Erdos and A. Renyi, "The evolution of random graphs," *Magyar Tud. Akad. Mat. Kutato Int. Kozl* 5, pages 17-61, (1960).) More specifically, if the edge-probability is greater than the threshold then almost all of the graphs produced by the model will be connected. Erd"os and Rényi have shown the sharp connectivity threshold is $\ln \theta/\theta$, where $\theta$ is the number of nodes in the graph. Therefore, if there are m P2P bots in a network and if bot-edge probability is greater then $\ln m/m$, then the dye-pumping algorithm can identify all other P2P bots from a given seed bot with high probability. However, even if the bot-edge probability is below the threshold, the dye-pumping algorithm can still identify some of the P2P bots, which happen to be connected to the seed node on the private mutual-contacts graph. Therefore, what portion of the nodes $X_1, X_2, \ldots, X_m$ are connected to the seed node by a short path is also of interest. For this purpose, an upper bound for the probability of accessing any HypoBotnet peer $X_i$ in the network at most h hops from the seed node may be written as:

$$P_r < 1 - \Pi_{j=1}^{h}[(1-(p_{e\_HypoBotnet})^j)^{Perm(m-2,j-1)}] \quad (10)$$

where Perm(x, y)=x!/(x−y)! and m is the number of P2P bots in the network.

Figure 11:
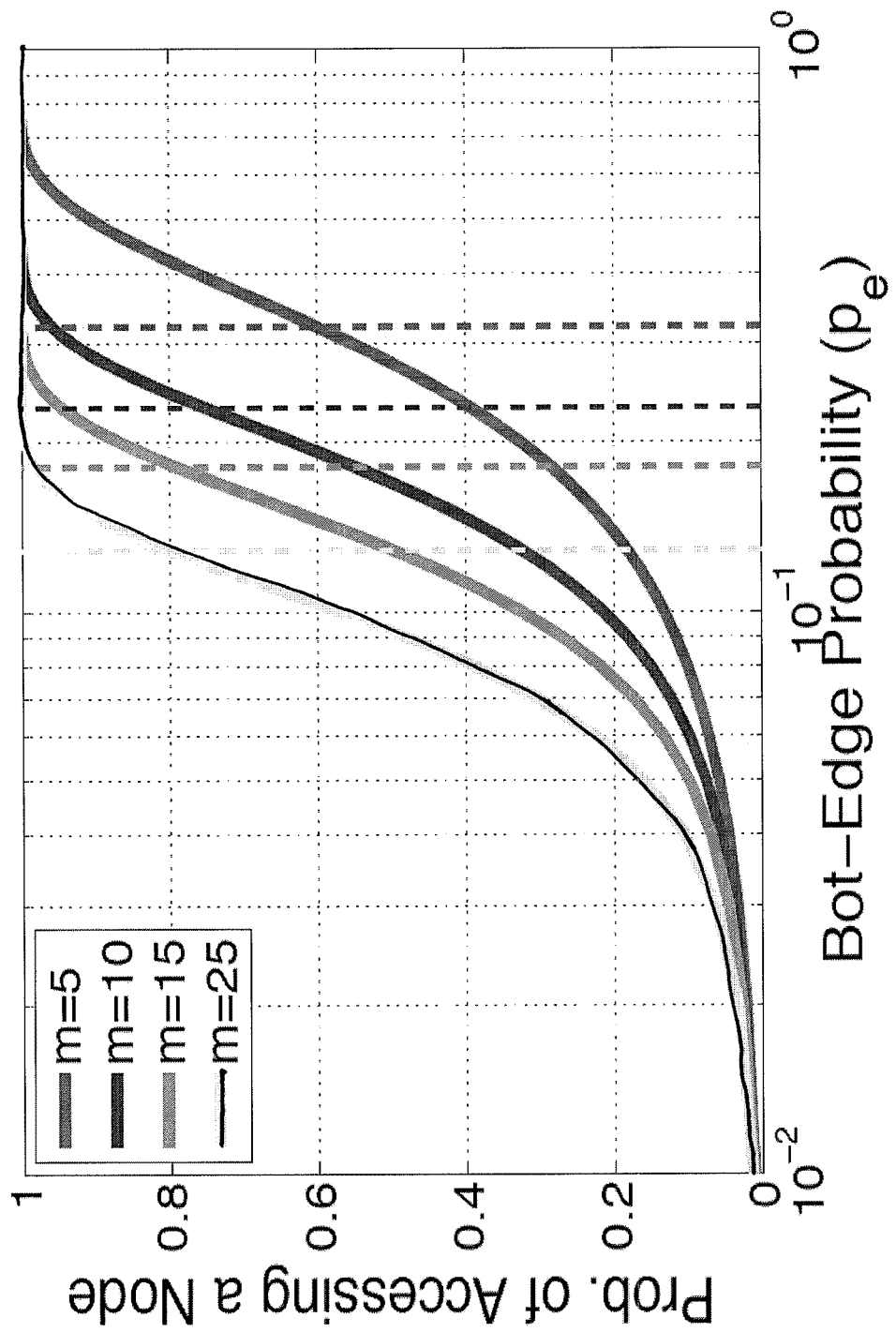
FIG. 11 illustrates a probability of accessing a node at most 3 hops in Erdos-Rényi subgraph for different bot edge probabilities and for different numbers of bots in the network, in an exemplary simulated system consistent with the present invention.

FIG. 11 depicts a probability of accessing a node for different $p_{e\_HypoBotnet}$ and m values. The maximum number of hops was set to h=3. It is observed that the probability approaches 1 as the bot-edge probability increases. The probability curves exhibit sharp increase around the connectivity threshold due to the sharp threshold phenomena mentioned earlier. Interestingly, it is also observed that, the probability grows faster as the number of nodes in the subgraph gets higher. Therefore, it gets easier for the proposed method to reveal P2P bots as the botmaster infects more hosts in the network. The maximum path length was set to h=3 since the Erd"os-Rényi random graphs have short diameters. More specifically, assuming that there are not very large number of P2P bots in a network and bot-edge probability is not very small, it may be advantage to not search for a P2P bot more than 3 hops away from the seed node.

§5.5.1.1 Expected Performance in Various Scenarios

In the previous subsections, it was shown that the members of a P2P botnet tend to be clustered with high capacity edges on the corresponding private mutual contacts graph and therefore, the dye pumping process is able to identify them. However, aside from P2P bots, some benign applications and certain user behavior might also introduce private mutual contacts and result in edges on private mutual contacts graphs. For instance, a very small set of people might visit a common niche website which no other user from that network visits. Also, benign P2P applications may create several edges on private mutual-contacts graphs. In addition, remote hosts behind a NAT introduce edges between nodes, even if the corresponding local hosts did not communicate with the same remote host. Such benign cases pose potential problems to the dye pumping process in terms of miss and false alarms. More specifically, some benign nodes will become connected to the clusters formed by P2P bots on a private mutual-contacts graph and therefore some portion of the dye will leak to the benign nodes resulting in them being detected as P2P nodes and/or preventing the actual P2P bots from accumulating enough dye.

In order to assess the magnitude of these problems, the properties of the private mutual-contacts graphs constructed from flow records captured at the border of our university network, which is a mid-size/16 network with about 3000 active hosts was investigated. The private mutual contacts graphs for three different privacy thresholds, k=2, k=5 and k=10 were constructed and the observation window was set to 24 hours, representing a typical weekday. In these private mutual-contacts graphs, the number of benign edges, their distribution among the nodes and their capacities were investigated. The clustering structure of the nodes is also investigated since a group of benign nodes clustered together might drastically affect the result of dye-pumping algorithm especially when a benign cluster is connected with the cluster formed by P2P bots.

Benign Edges

In an ideal case for the proposed method, all the edges in a private mutual contacts graph are caused by P2P botnet communications. However, this will seldom, if ever, be the case. Nevertheless, the fewer the benign edges, the more effective the proposed method.

TABLE 2

| k | No. of benign edge pairs | No. of benign edge pairs/ No. of all possible edge-pairs |
|---|---|---|
| 2 | 65692 | 0.0068 |
| 5 | 152762 | 0.0159 |
| 10 | 280466 | 0.0291 |

Table 2 depicts the number of edges-pairs observed in the private mutual contacts graphs constructed from our network's flow records for different privacy thresholds. We suspect that most of these edges are due to benign applications, however, the exact ratio is not known since the ground truth on P2P botnet traffic in the observed data is not available. As expected, the number of edges gets higher as the privacy threshold (k) increases, since increasing the privacy threshold results in more private mutual contacts. To better understand the true effect, the ratios of number of edges to the number of all possible edges in the graph (i.e. completely connected graph) are also given in Table 2. For instance, it is observed for k=5 that 1:5% of all possible edge-pairs actually appear in the constructed private mutual-contacts graph. Despite these benign edges, the proposed dye pumping process performs satisfactorily.

Node Degree Distribution

Figure 12:
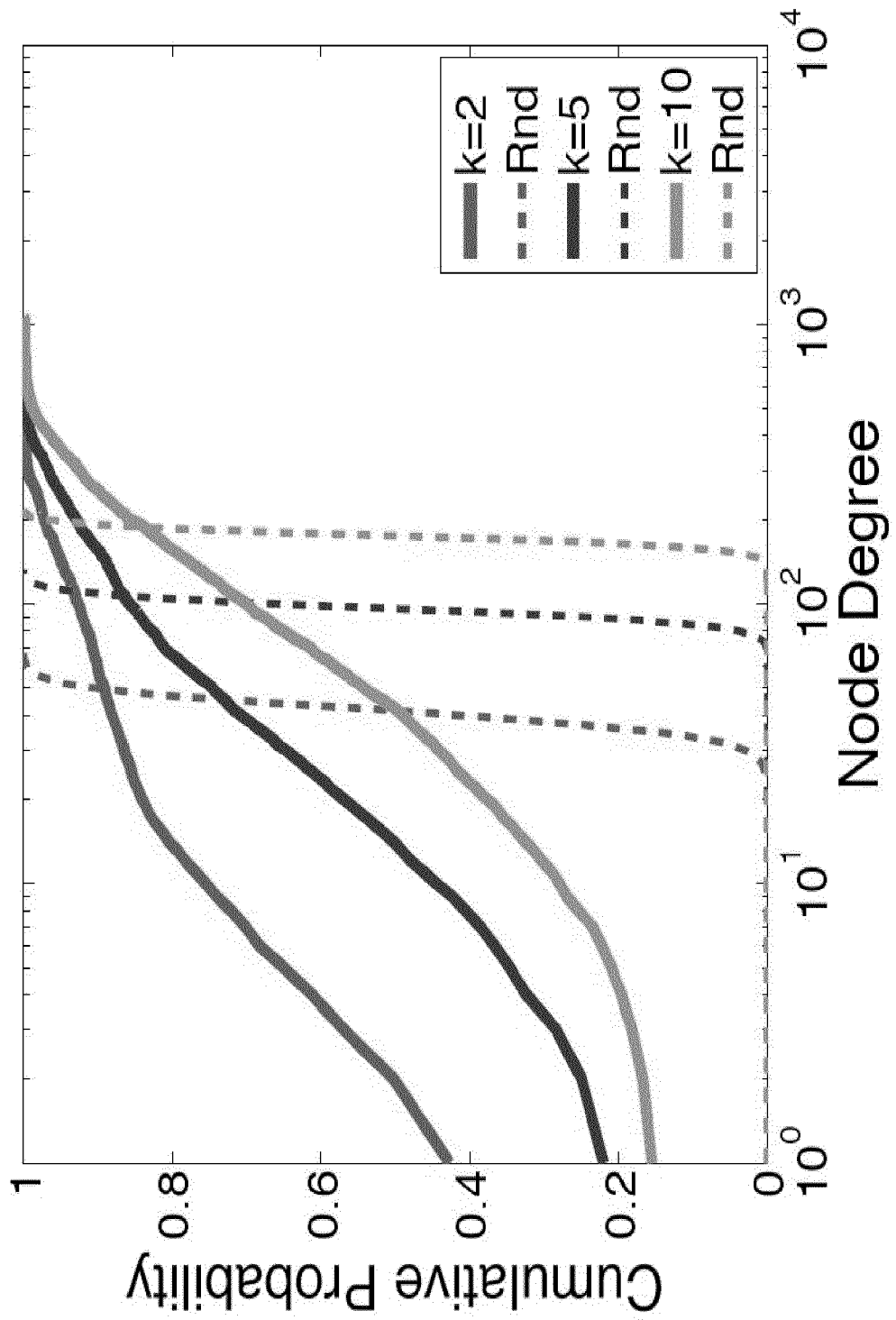
FIG. 12 illustrates a cumulative distribution function of node degrees in the private mutual contacts graph for different privacy threshold values, in an exemplary simulated system consistent with the present invention.

Another way to investigate benign edges in the graph is to look at the distribution of node degrees, where a degree of a node is defined as the number of other nodes it is connected to. FIG. 12 depicts the cumulative distribution functions (CDF) of node degree distributions for different k. Dashed lines in the figure show the corresponding CDF if the same number of edges were distributed randomly among the nodes representing the case when the nodes in the graph have equal probability of having an edge-pair. In the random case, the node degrees would be concentrated around a mean value, therefore we observe a steep climb on the dash-lines. However, the solid lines in FIG. 12 suggest that in reality a substantial portion of the nodes don't have any edges at all or have few edges. It is also observed that there are few nodes which have significantly more edges than the others. Since the number of such high-degree nodes is relatively low, the proposed scheme performs satisfactorily in many scenarios.

Benign-Edge Capacities

Figure 13:
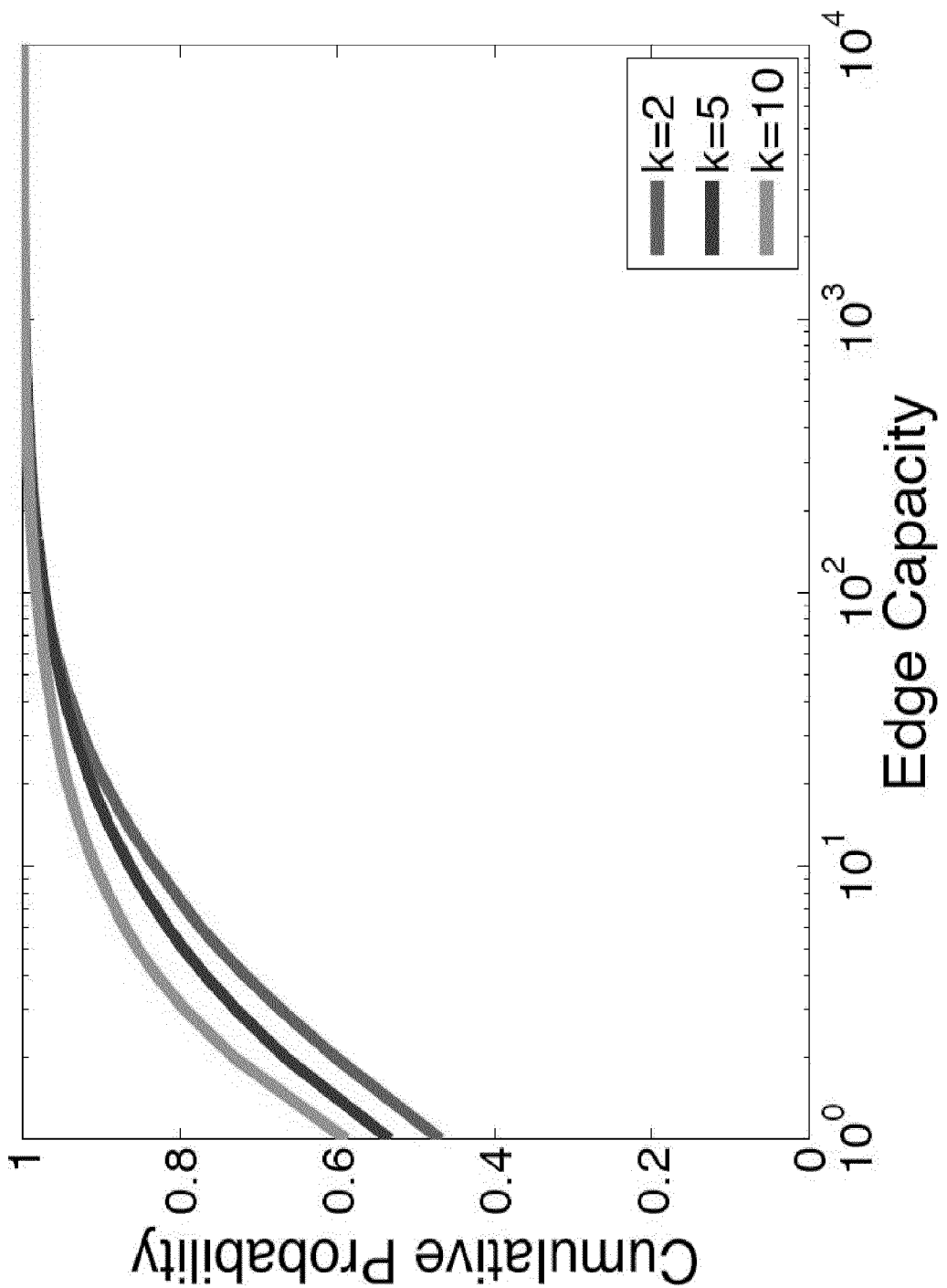
FIG. 13 illustrates a cumulative distribution function of edge capacity for different privacy threshold values, in an exemplary simulated system consistent with the present invention.

As described above, the capacity of an edge in a private mutual-contacts graph represents the number of mutual contacts between the corresponding two nodes. As discussed in previous sections, it is crucial for the dye pumping process that the capacities of the benign edges are low. Otherwise, significant portion of the dye pumped to a private mutual-contacts graph from a seed node would potentially leak towards benign nodes. FIG. 13 depicts the cumulative distribution functions of edge capacities for the private mutual-contacts graphs constructed from our network's flow records for different privacy threshold values. With reference to FIG. 13, it is observed that more than half of the edges in the constructed graphs have capacities equal to 1 and approximately 80% of the edges have capacities less than 10. P2P botnets can easily result in edges having capacity greater than 1 and in some cases even grater than 10 (i.e. all investigated real P2P botnets). Hence, in practice, the effect of benign edges is limited and the proposed scheme identifies P2P bots effectively in many scenarios.

Clustering Coefficient

From the dye pumping process's perspective, it is undesirable for benign nodes to cluster together in the private mutual-contact graph. Because, if even one member of such a benign cluster has an edge with a P2P bot, then a significant portion of the dye pumped from the seed node would leak and accumulate in the benign cluster, thereby causing false positives.

One way of measuring the level of clustering in a graph is the clustering coefficient. The clustering coefficient of a node in a graph is defined as the ratio of the number of the actual edges to the number of all possible edges among the neighbors of that node. To be more formal, suppose the $i^{th}$ node ($N_i$) of a graph has $e_i$ edges. Notice that $e_i$ edges also means that $N_i$ has $e_i$ neighbors. Therefore, there can be at most $$\binom{e_i}{2} = e_i(e_i - 1)$$

edges among $N_i$'s neighbors. So, if $E_i$ represents the actual number of edges among $N_i$'s neighbors, then the clustering coefficient of $N_i$ is defined as $Cl_i = E_i/e_i(e_i-1)$. The clustering coefficient measures how close the neighbors of a node are to being a clique. For instance the clustering coefficient of a node is 1 if it's neighbors are completely connected. If a node has less than 2 neighbors, its clustering coefficient cannot be computed and hence is regarded as 0.

Figure 14:
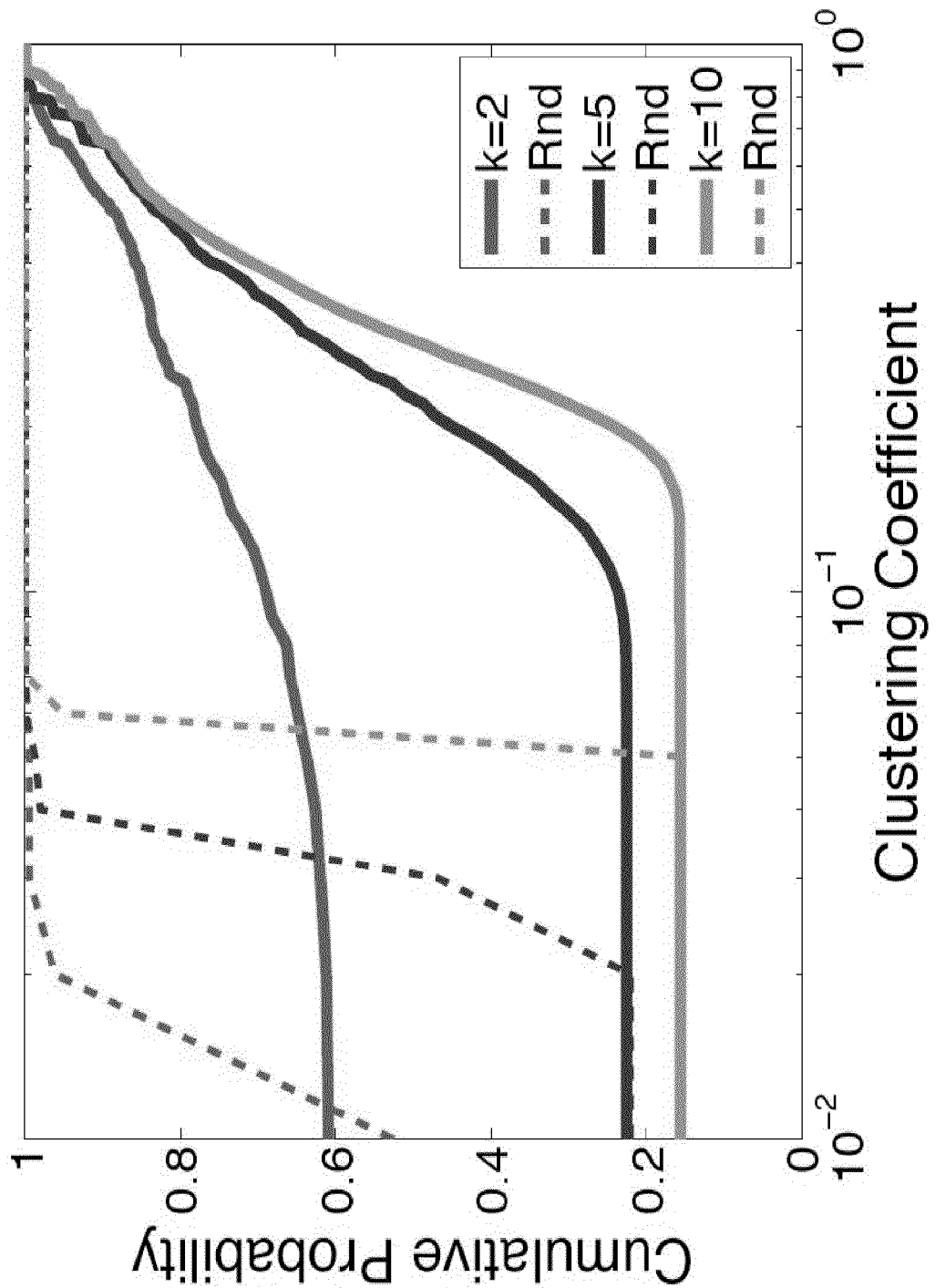
FIG. 14 illustrates a cumulative distribution function of clustering coefficient for different privacy threshold values, in an exemplary simulated system consistent with the present invention.

FIG. 14 depicts the cumulative distribution functions of clustering coefficients for the private mutual contacts graphs constructed from the network's flow records for different privacy thresholds. For reference, dashed lines show the CDF of clustering coefficients if the same number of edges as in the original graphs were distributed randomly among the nodes, representing no intentional clustering. It is observed for all three k values that, the graph has more clustered structure than the corresponding random case. Also, the graph becomes more clustered as the k value increases. This is because, a private mutual-contact, which is in communication with $\gamma < k$ internal hosts during observation window, results a clique in the graph with $\gamma$ nodes, since there's an edge placed between all the communicating internal hosts. Consequently, increasing k results in larger cliques and therefore more nodes having high clustering coefficients. The experiments indicate that the clustering levels plotted in FIG. 14 don't have severe impact on the performance of the dye pumping process.

Selecting the Privacy Threshold

The privacy threshold (k) is an important parameter in constructing private mutual-contacts graphs for the dye-pumping process. As observed in previous subsections, changing k drastically changes the graph structure even though the exact same flow record data is used to construct graphs each time. For smaller k, the resulting private mutual-contacts graphs will have fewer and lower-capacity benign edges and consequently will be less clustered. However, smaller k increases the probability of missing some of the edges between P2P bot peers. That is, for smaller k, the probability of an external P2P bot communicating with more than k internal P2P bots, therefore not being considered as a private mutual-contact, is higher. Using a larger k, on the other hand, yields more benign edges and more clustered graphs, resulting in more false positives. The experiments show that k=5 were an appropriate setting for the privacy threshold for our network's traffic characteristics.

Dynamic IP Addresses

The proposed method distinguishes between local hosts by their IP addresses. Therefore, it is important that the IP address of a local host doesn't change during the observation window. One way to mitigate this is to set the observation window appropriately. For instance, one expects that only few hosts in a network change their IP addresses during a weekday. Nevertheless, one can track the hosts frequently changing their IP addresses (i.e. mobile hosts) by incorporating DHCP, logs etc.

§5.5.1.2 Experiments and Results

For HypoBotnet experiments, B distinct IP addresses representing all peers of the HypoBotnet were randomly generated. In the meantime, the flow records generated at our network's border during a 24-hour period (i.e. the observation window is 24 hours) on a weekday were acquired. The flow records indicate that there were 3103 active IP addresses in the network during the observation window. Then, m of these 3103 active hosts were randomly picked and their flow records were modified as if they were infected by the HypoBotnet. More specifically, extra records were appended to the acquired set of flow records as if each of these m selected hosts communicated with C of all possible B HypoBotnet peers. C peers out of B peers were selected uniformly at random for each picked host. As a result, a list of flow records captured during the observation window for the network containing m hosts infected by the HypoBotnet was obtained. The private mutual contacts graph was constructed using this list of flow records, where the privacy threshold was set to k=5. Recall that the goal is to identify the members of a P2P botnet in a network using a previously known peer of the same botnet. Therefore, one of the m infected hosts was randomly picked as the seed node and the dye pumping process was run on the constructed private mutual-contacts graph. The number of iterations was set to maxIter=3 for the dye pumping process to avoid searches for P2P botnet peers more than 3 hops away from the seed node (due to the Erd"os-Rényi model). Recall from the above sections that the output of the dye pumping process is the dye level vector indicating the level of accumulated dye at each node. After the dye-level vector was obtained, the nodes which have dye level higher than T=0.005, where T is threshold confidence level, were declared as the members of HypoBotnet. The setting of the threshold to T=0.005 was experimentally verified to yield satisfactory precision and recall results.

Precision and Recall

In the context of the present invention, precision can be defined as the ratio of the number of correctly detected P2P bots to the number of all the nodes declared as being P2P bot. On the other hand, recall can be defined as the ratio of the number of correctly detected P2P bots to the number of all HypoBotnet peers in the network (m). To compute precision and recall, the experiment was independently repeated 20 times for each combination of the following HypoBotnet parameter sets: B={50000, 100000, 250000, 500000}, C={5, 10, 25, 50, 75, 100, 200, 500, 1000, 2000} and m={5,10,15, 25}. Then the average of precision and recall values over 20 repetitions for each of the parameter combinations was computed.

Figure 15:
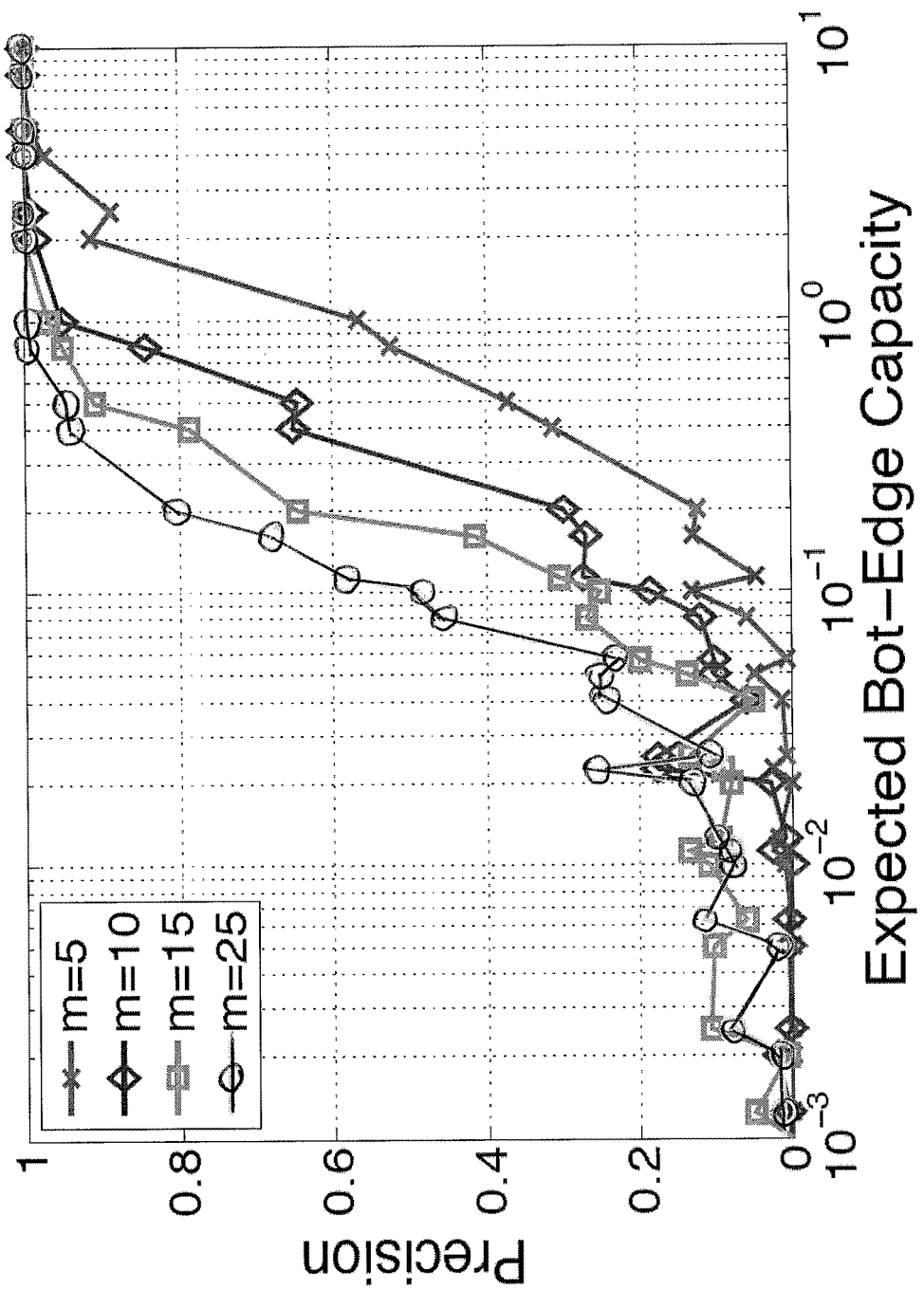
FIG. 15 illustrates average precision versus expected HypoBotnet edge capacity for different number of bots, in an exemplary simulated system consistent with the present invention.

FIG. 15 depicts the average precision values versus the expected capacity of edges between HypoBotnet peers ($E[C_p]=C^2/B$) for different m values. It is observed that, the precision value climbs steeply as the expected bot-edge capacity approaches 1. This is because, when expected bot-edge capacity becomes 1, the hosts infected by HypoBotnet form a completely connected subgraph on the private mutual-contacts graph with high probability. It is also observed that, the precision is higher when there are more infected hosts in the network, since the probability of an Erd"os-Rényi graph being connected gets higher as the number of it's nodes increases.

Figure 16:
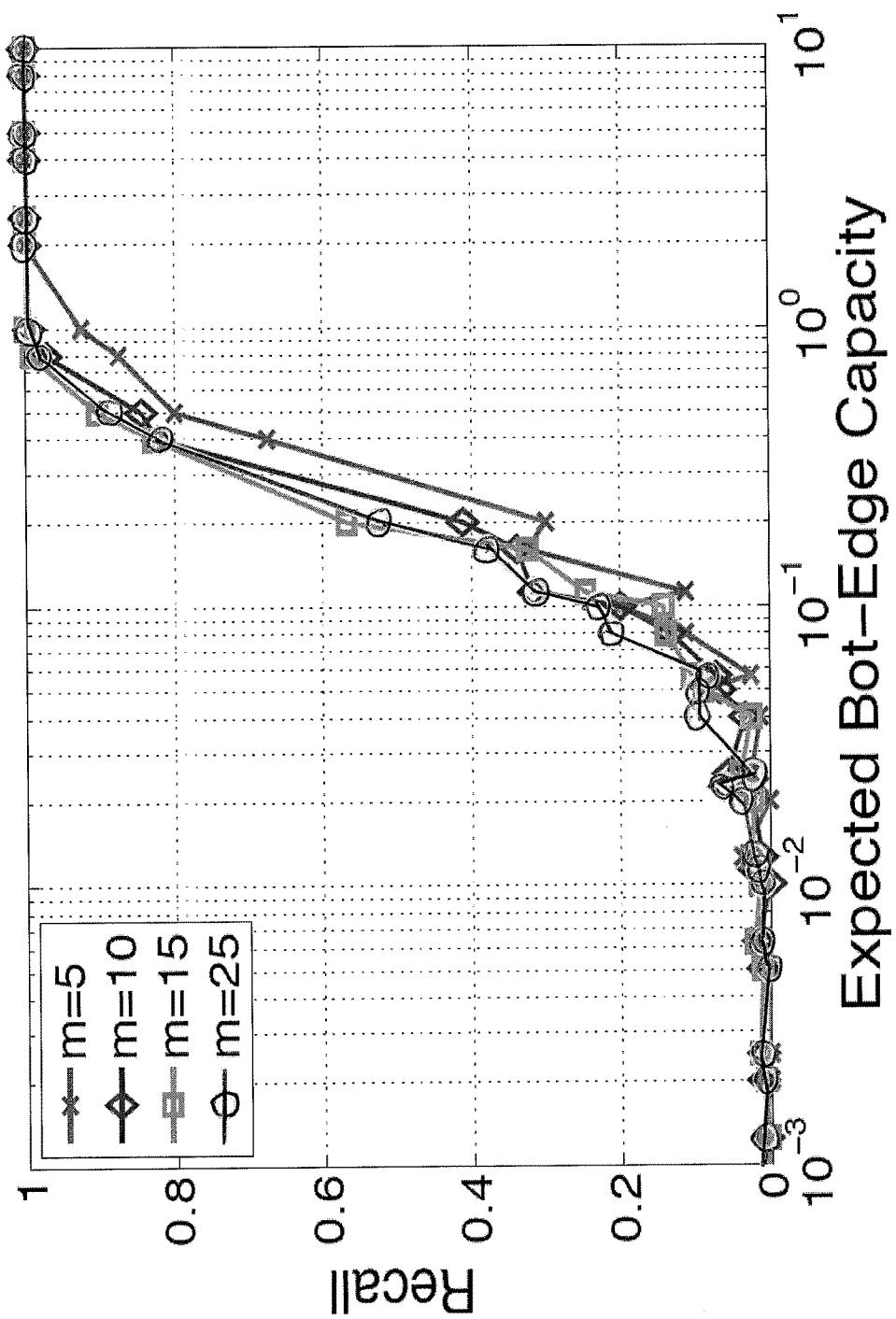
FIG. 16 illustrates average recall versus expected HypoBotnet edge capacity for different number of bots, in an exemplary simulated system consistent with the present invention.

FIG. 16 depicts the average recall values versus $C^2/B$ for different m values. Like precision, recall values also exhibit a steep climb as the expected botedge capacity approaches 1 for the same reason. Therefore, it can be concluded that the dye pumping process can identify P2P bots with almost perfect precision and recall so long as $C^2/B>1$.

Upper Bound

Figure 17:
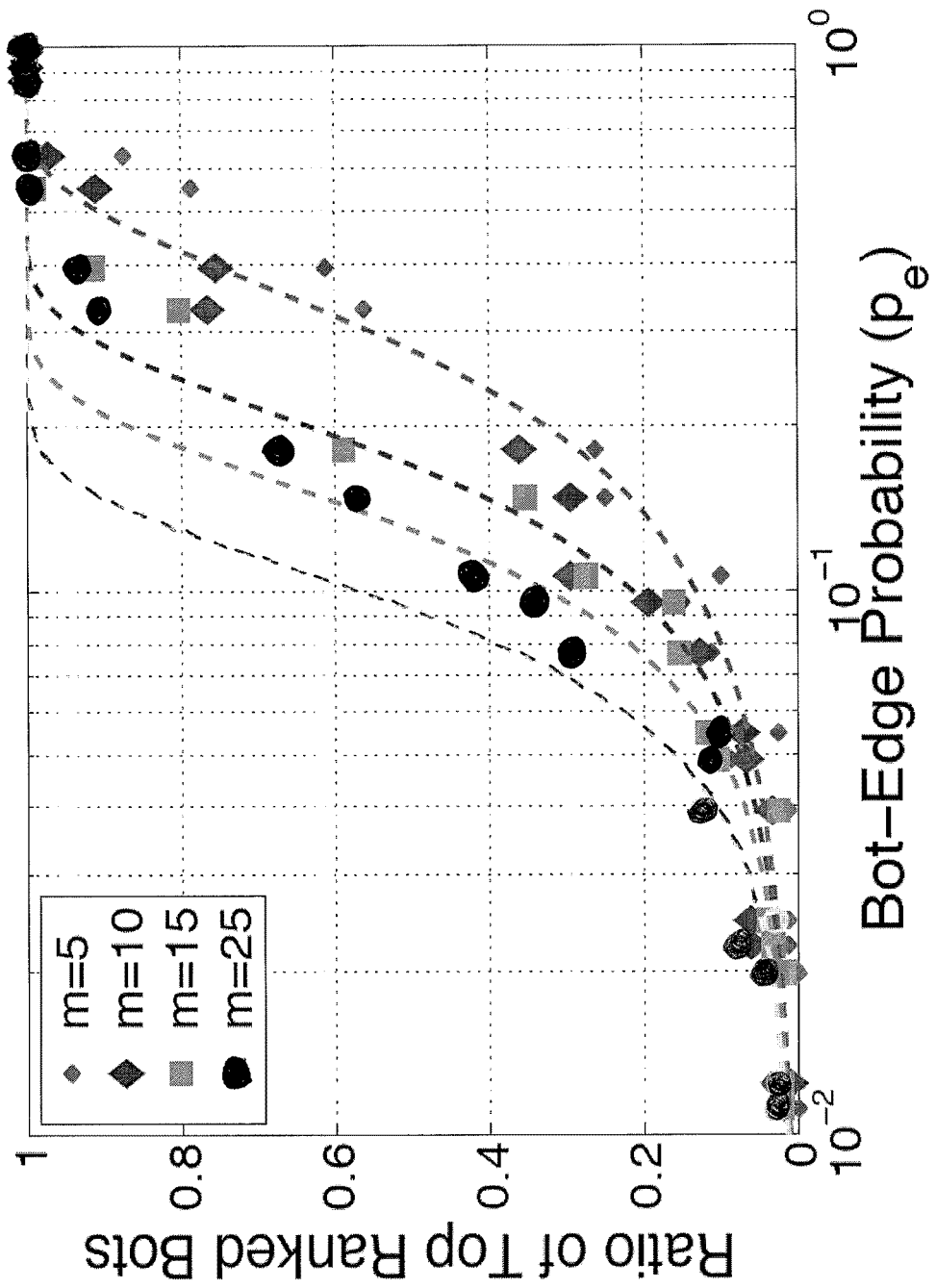
FIG. 17 illustrates bot edge probability versus ratio of top ranked bots for different number of bots, in an exemplary simulated system consistent with the present invention.

The benign applications and certain user behavior might result in private mutual-contacts between nodes in a network. Therefore, such cases might introduce benign edges in private mutual-contacts graphs and confuse the dye pumping process. It was also shown (Recall section §5.5.1.1.) that private mutual contacts graphs constructed from our network's flow records do contain such benign cases. In order to demonstrate their effect on the proposed method, after each execution of the dye pumping algorithm in HypoBotnet experiments, the hosts in our network were ranked by their level of the accumulated dye (i.e. their entry on the dye level vector) and the m highest-ranked nodes were picked. If there were no benign edges on private mutual contacts graphs, the frequency of the actual HypoBotnet peers within these m highest-ranked nodes would match the curves presented in FIG. 11. Recall that FIG. 11 shows, in an expectation sense, the upper bound of what fraction of the P2P bots in a network are connected to the seed node through a path shorter than h=3 hops. However, FIG. 17 shows that, the dye pumping process approaches but does not fully achieve the upper bound. All of the potential problems contribute to the gap between the actual detection performance and the upper bound. It is also observed in FIG. 17 that, the gap between the upper bound and the actual performance is higher when the number of P2P bots (m) is high. This is because as the number of P2P bots increases, the probability of the dye pumping process encountering a benign edge also increases. In conclusion, the dye-pumping process is expected to deviate more from the upper bound as the network traffic exhibits the potential problems.

Real P2P Botnets

As for real P2P botnets, it was discussed above that both Storm and Waledac botnets have bot-edge probabilities equal to 1 and expected edge capacities greater than 300. Therefore, according to the HypoBotnet experiments, the dye pumping process is expected to identify both Storm and Waledac peers in the network with almost perfect precision and recall. Nevertheless, for both botnets, three hosts using the same setup explained earlier were infected. Then one of the infected hosts was randomly picked as the seed node and tried to identify other two among all the nodes in the network. It was observed, that the dye pumping process successfully identified the other two P2P bots for both Storm and Waledac.

§5.5.2 Nugache Botnet Data

In order to systematically assess the performance of the proposed scheme against a real-world botnet, one needs to know the IP addresses of the members of a P2P botnet in a given network. Otherwise, nothing can be said about the true positive or false alarm rate without knowing the ground truth. One way to obtain the ground truth is to blend real botnet data into the network traffic and make a few hosts look as if they have been infected by the botnet. This strategy essentially aggregates real botnet traffic and real user traffic on some of the hosts and therefore provides a realistic scenario. From the proposed scheme's perspective, to make a host look like a P2P bot, one can first capture the flow records of the network, which contains the host, during a time window. Then one can collect the flow records form a real P2P bot during a similar time window. Following that, one can change the bot's IP address in these botnet flow records to a selected host's IP address and append them to the flow records of the entire network so that, along with its original traffic, the selected host will appear as if it has also communicated with the external IP addresses that the real bot has talked to.

In order to establish the ground truth for the experiments, data collected from the Nugache botnet (which has been thoroughly studied in the article, D. Dittrich and S. Dietrich, "Discovery techniques for P2P botnets," *Stevens Institute of Technology CS Technical Report* 2008-4, (September 2008); and S. Stover, D. Dittrich, J. Hernandez, and S. Dietrich, "Analysis of the storm and nugache trojans: P2P is here," *login: The USENIX Magazine*, volume 32-6, (December 2007)) were utilized. Briefly speaking, Nugache is a P2P botnet that uses random high-numbered ports for its communication over TCP. The data used in the experiments are compiled by the Nugache crawler presented in the article, D. Dittrich and S. Dietrich, "P2P as botnet command and control: A deeper insight," *MALWARE* 2008, 3rd International Conference on Malicious and Unwanted Software (2008) and its communication between Nugache peers.

Details on the Nugache botnet and Nugache crawler can be found in the article, D. Dittrich and S. Dietrich, "Discovery techniques for P2P botnets," *Stevens Institute of Technology CS Technical Report* 2008-4, (September 2008); and S. Stover, D. Dittrich, J. Hernandez, and S. Dietrich, "Analysis of the storm and nugache trojans: P2P is here," *login: The USENIX Magazine*, volume 32-6, (December 2007). In summary, the C&C protocol of Nugache enables querying a peer for its list of known peers and a list of recently communicated peers. Using this functionality, the crawler starts from a series of seed peers and traverses the botnet by querying peers for their list of known peers. The crawler maintains the list of recently communicated peers for each accessible Nugache peer. Consequently, when it finishes crawling, it produces list of recently communicated peers for several Nugache peers.

In the experiments, data collected by the crawler when Nugache was active was used. To collect data, the crawler was executed repeatedly for 9 days, where each execution lasted roughly 30 to 45 minutes. A 24-hour observation window was used for the experiments. Hence, several randomly selected 24-hour segments of the crawler data from the 9-day results were employed in the experiments to cover the botnet dynamics during all 9 days. It was observed that in any of these 24-hour segments, 904 Nugache peers responded to the crawler on an average. It was also observed that 34% of all possible pairs of Nugache peers communicated with at least one mutual-contact on average.

Background Traffic

In order to obtain background traffic that could be blended with Nugache traffic, the flow records observed at the border of Polytechnic Institute of NYU network were captured during a typical weekday (i.e. the observation window is 24 hours). Collected flow records indicated that there were 2128 active IP addresses in the network during the observation window. Then the mutual-contacts were extracted from the recorded data. To ensure a valid communication (i.e. not a scan flow), only external IPs which exchanged a sufficient amount of data (i.e. at least 256 bytes) in both directions with at least one internal IP were considered. Finally, the corresponding mutual contacts graph was built to serve as a basis for the experiments.

It was immediately observed in the mutual contacts graph that DNS servers within the network shared a significantly large number of mutual-contacts with each other. As a matter of fact, DNS servers constituted the highest-magnitude entries of the first eigenvector of the matrix (E) whose entries are the corresponding edge capacities ($E_{ij}$). This is not surprising since DNS servers in a network communicate with many other DNS servers around the world. Obviously this relationship among DNS servers dominates the mutual contacts graph and taints the results of the dye pumping process.

Hence, all the edges of the 11 DNS servers in the network were removed from the mutual contacts graph. The mutual contacts graph extracted from the background traffic suggests that a majority of the hosts share none or very few mutual contacts with other nodes.

Figure 18:
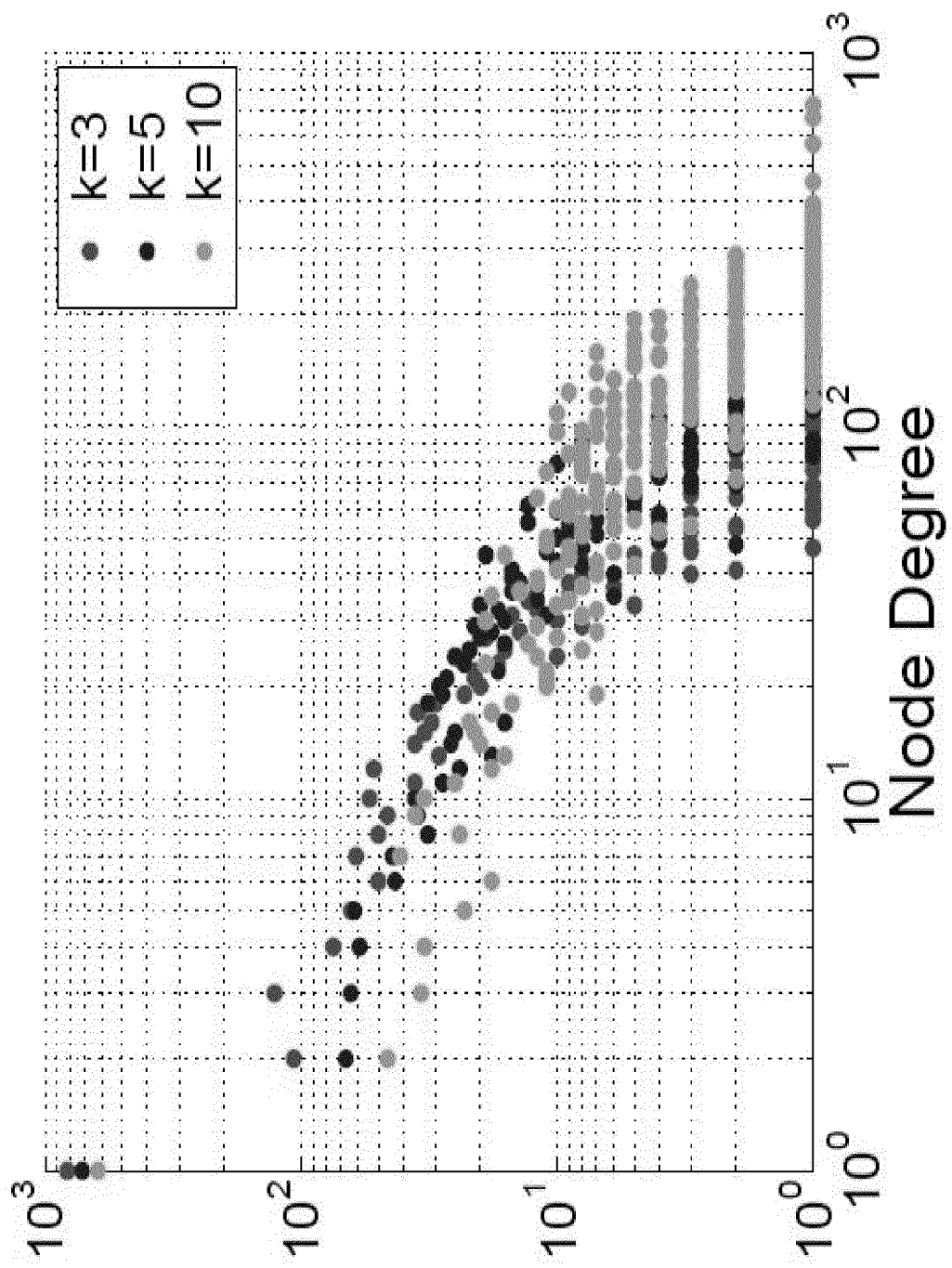
FIG. 18 illustrates a node degree of the mutual contacts graph of a background traffic for different privacy threshold values, in an exemplary simulated system consistent with the present invention.

FIG. 18 depicts a node degree (i.e. number of edges of a node) of the mutual contacts graph of the background traffic for different privacy threshold (k) values. FIG. 18 shows, as expected, that nodes usually have a higher node degree in the mutual contacts graph when a higher privacy threshold (k) value is used to construct the graph.

Figure 19:
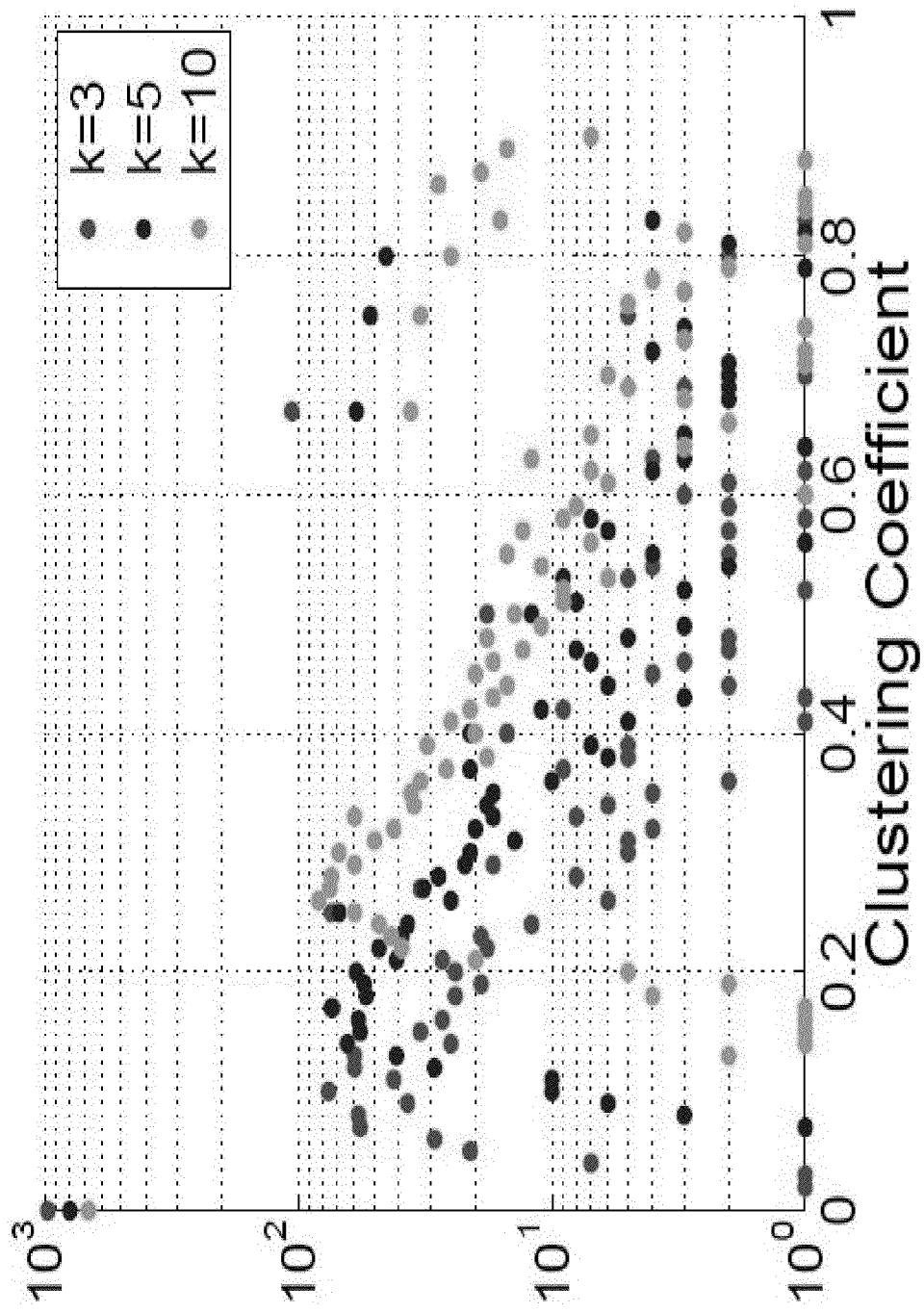
FIG. 19 illustrates clustering coefficient distributions of the mutual contacts graph of a background traffic for different privacy threshold values, in an exemplary simulated system consistent with the present invention.

FIG. 19 depicts a clustering coefficient distribution of the mutual contacts graph of the background traffic for different privacy threshold (k) values. The clustering coefficient is defined as the ratio of the number of the actual edges of a node to the number of all possible edges among its neighbors. As shown in FIG. 19, the mutual contacts graph is a lot more clustered than a comparable random graph (i.e. same number of nodes and edges). For instance the clustering coefficient distribution of a random graph comparable to the mutual-contacts graph with k=5 has a mean of 0.006 and standard deviation of 0.009. This suggests that there are communities of hosts in the observed network where community members usually communicate with the same external IPs that are exclusive to the corresponding community. It may be speculated that these communities may represent peers of different P2P networks (legitimate or bot) or a group of users visiting similar websites etc.

§5.5.2.1 Experiments with Nugache

In order to assess the performance of the proposed scheme in detecting Nugache bots, m Nugache peers were randomly picked from a randomly selected 24-hour segment of the crawler data. Then, the mutual contacts graph corresponding to these m Nugache peers was computed based on the recently-communicated peers field of the crawler data. Then m internal hosts corresponding to the background traffic were randomly picked from the mutual-contacts graph. Finally, the mutual contacts graph of the Nugache peers was superposed onto the mutual contacts graph of the background traffic where m Nugache peers coincide with m selected internal hosts. This procedure essentially blends Nugache traffic into the background traffic so that each of these m selected internal hosts looked as if they communicated with the peers that the corresponding m Nugache peers communicated with. Consequently, each of these m selected hosts becomes a real Nugache peer and constitutes the ground truth as far as the proposed scheme is concerned.

Once the superposed mutual contacts graph was obtained, one of the m hosts was randomly selected as the seed bot and the dye pumping process was run to detect the other m−1 hosts whose flow records were modified according to the Nugache crawler data. The number of iterations, maxIter was set to 5 for dye pumping process since it is almost impossible to find P2P botnet peers more than 3 hops away from the seed node due to the Erdos-Rényi model as will be explained in the mathematical analysis section. In the end, the list of hosts which accumulate more dye than the threshold as P2P bots were returned. To obtain statistically reliable results, the experiment was repeated 100 times, each time with a different selection of m hosts and m Nugache peers. Also a different 24-hour segment of crawler data was picked at every 20th repetition.

Results (Precision & Recall):

To gauge the dye pumping processes' performance, the average precision and recall was computed. Precision may be defined as the ratio of the number of Nugache peers in the returned list of hosts to the length of the returned list. On the other hand, recall may be defined as the ratio of the number of Nugache peers in the returned list to the number of all Nugache peers in the network except the seed bot (m−1).

Figure 20:
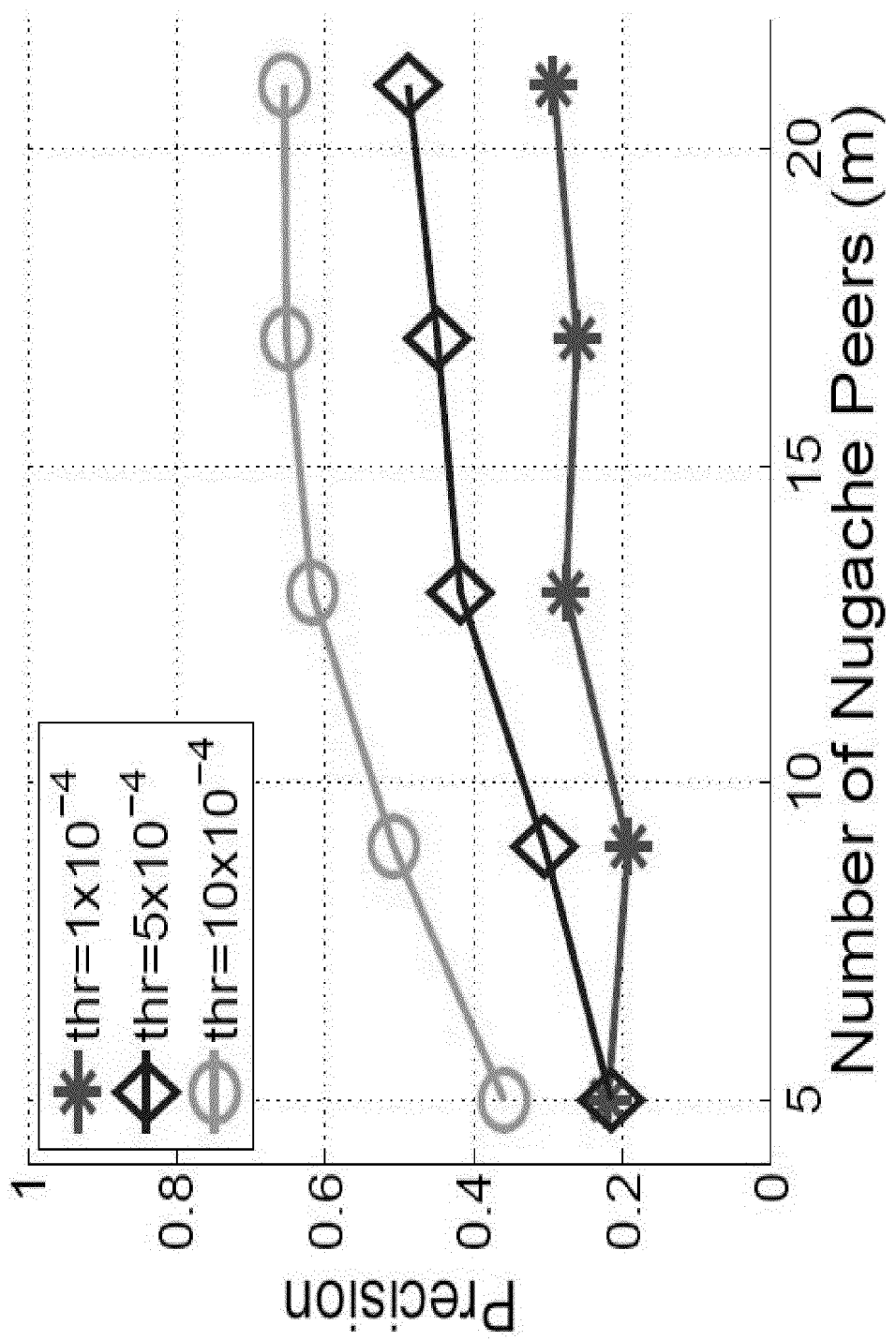
FIG. 20 illustrates the average precision values for different number of Nugache peers and different threshold values, in an exemplary simulated system consistent with the present invention.
Figure 21:
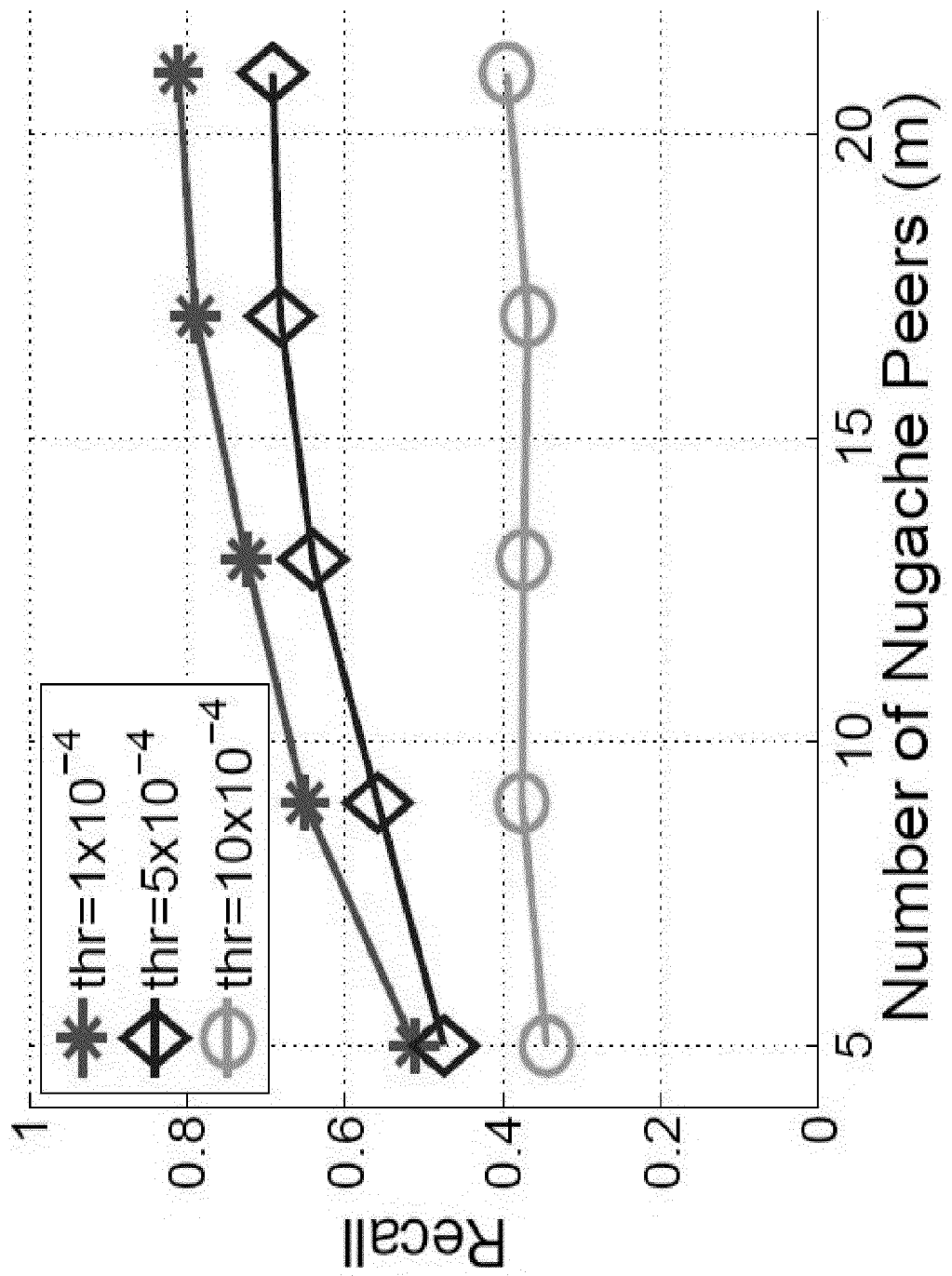
FIG. 21 illustrates the average recall values for different number of Nugache peers and different threshold values, in an exemplary simulated system consistent with the present invention.
Figure 22:
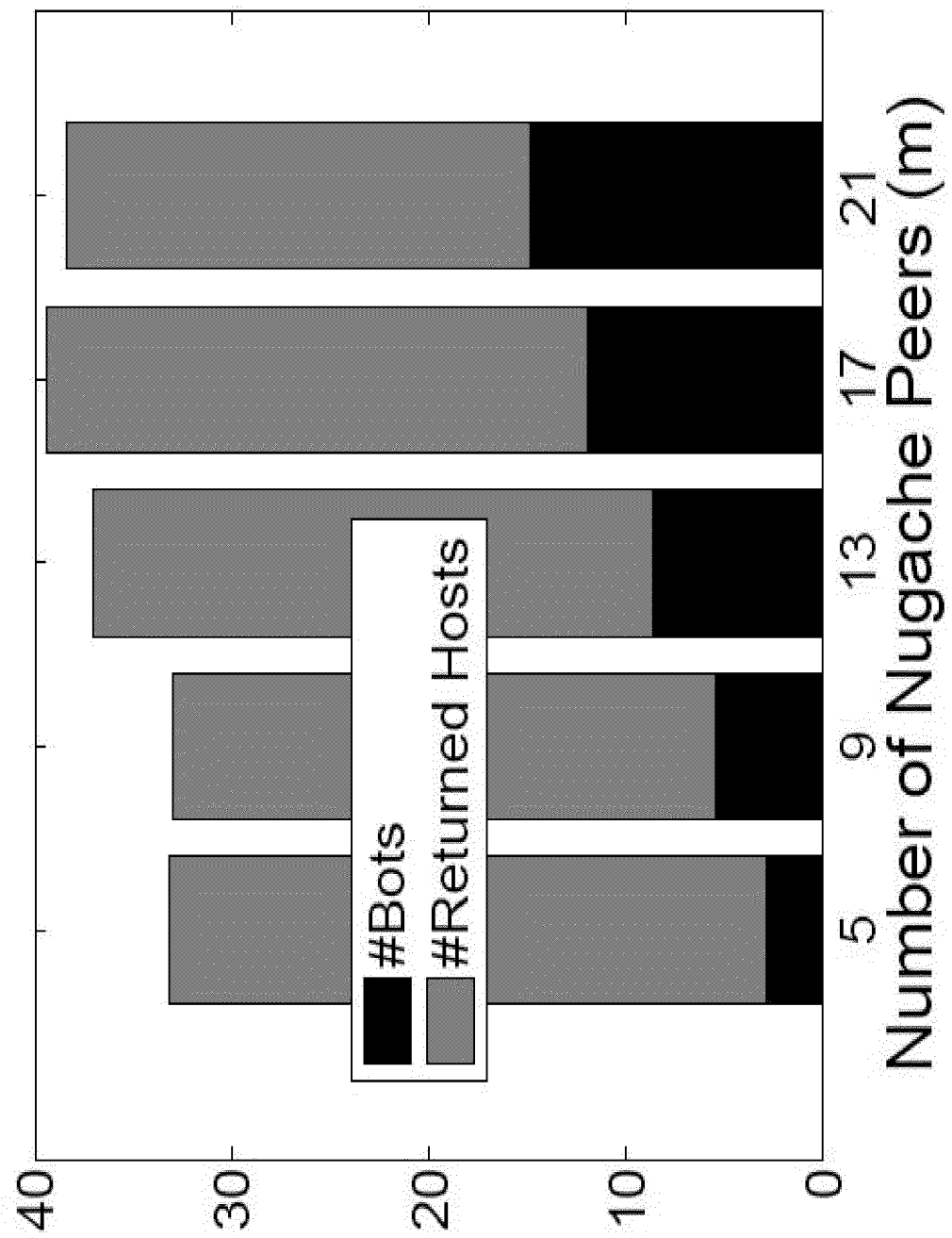
FIG. 22 illustrates a graph of number of Nugache peers and a total number of hosts, in an exemplary simulated system consistent with the present invention.

FIGS. 20, 21 and 22 depict the average precision and recall values for different number of Nugache peers (m) and different threshold values (thr). The privacy threshold was set to k=5 and node degree sensitivity coefficient was set $\beta=2$. It is observed that several dormant Nugache peers can be identified by the proposed technique when the threshold is set to an appropriate value. For instance, in FIG. 22 it is observed that, if there are 17 Nugache peers in the network, the proposed scheme on an average returns 35 hosts, 11 of which are Nugache peers. As a result, upon obtaining the list of potential P2P bots, a network administrator can perform a more detailed investigation (perhaps physically) on the hosts in the list and potentially uncover several dormant P2P bots. Meanwhile, the returned list also contains some hosts which are not Nugache peers since such hosts happen to be connected to one or more Nugache bots on the mutual-contacts graph due to mutual-contacts created by other applications. Interestingly, it is observed in FIGS. 20 and 21 that both precision and recall values increase as the number of bots (m) increases. This is due to a property of Erdos-Rényi random graphs that the probability of having a short path between two nodes increases with the number of nodes. It is also observed that, increasing the threshold increases precision but decreases recall, as is naturally expected for any detection system.

Effects of Privacy Threshold (k)

Figure 23:
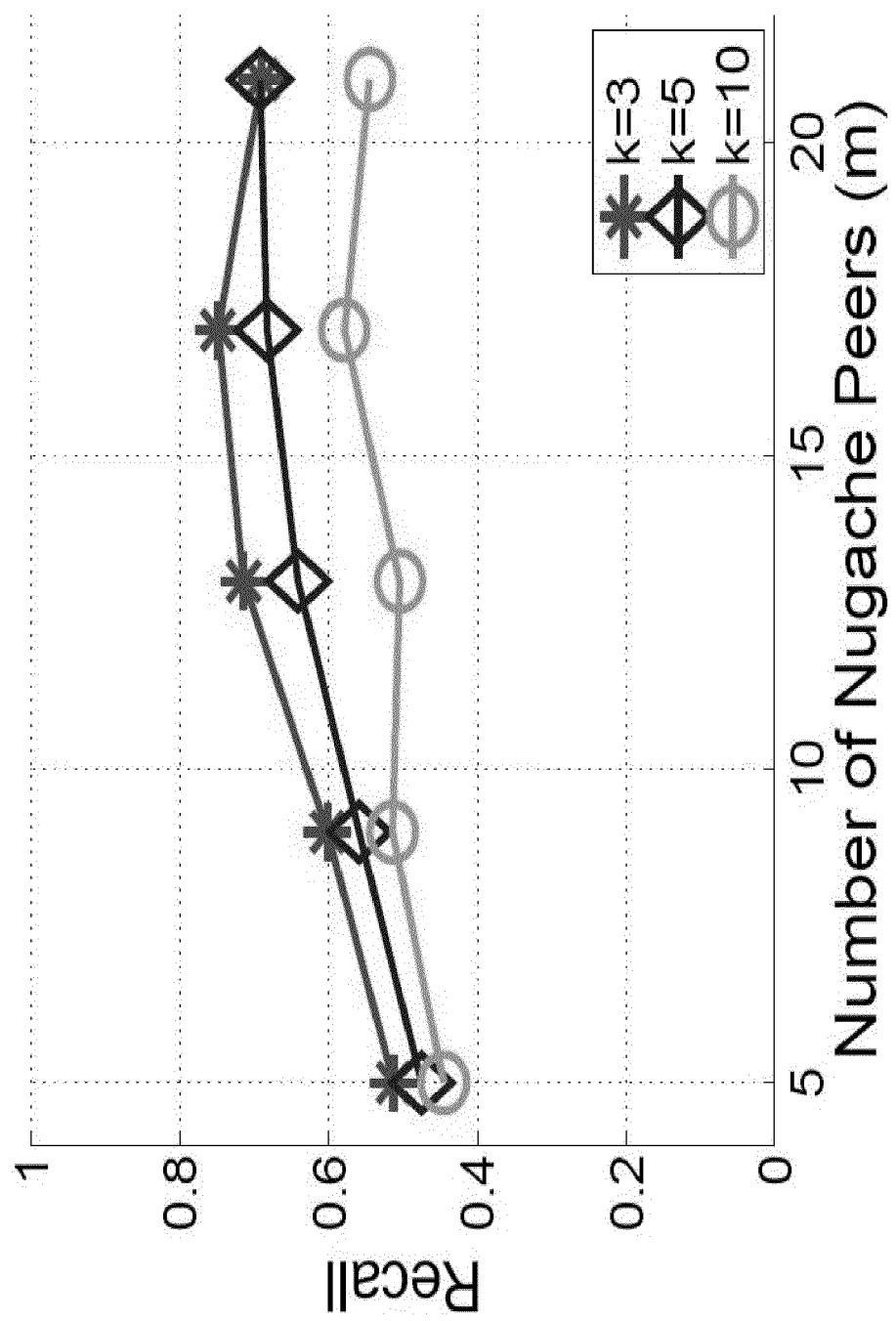
FIG. 23 illustrates recall values versus number of Nugache peers for different privacy threshold values, in an exemplary simulated system consistent with the present invention.

When the experiments were repeated for different k values, no major change in the precision performance was observed. On the other hand, as shown in FIG. 23, which depicts the recall values for different privacy thresholds, the recall performance improves as k decreases and as long as the number of P2P bots in the network is low. The recall performance improves because more background traffic is filtered out for lower k, thereby removing a significant portion of the benign edges. However, if there are many P2P bots in the network and if k is small (i.e. k=3), more than k of them are likely to communicate with several common external peers and therefore some of the botnet communications are likely to be filtered out as well. The effect of this phenomenon may be observed in FIG. 23, where recall performance diminishes for large number of Nugache peers. Hence, based on FIG. 23, it can be said that k=5 was an appropriate setting for the network.

Effects Node Degree Sensitivity Coefficient ($\beta$)

Figure 24:
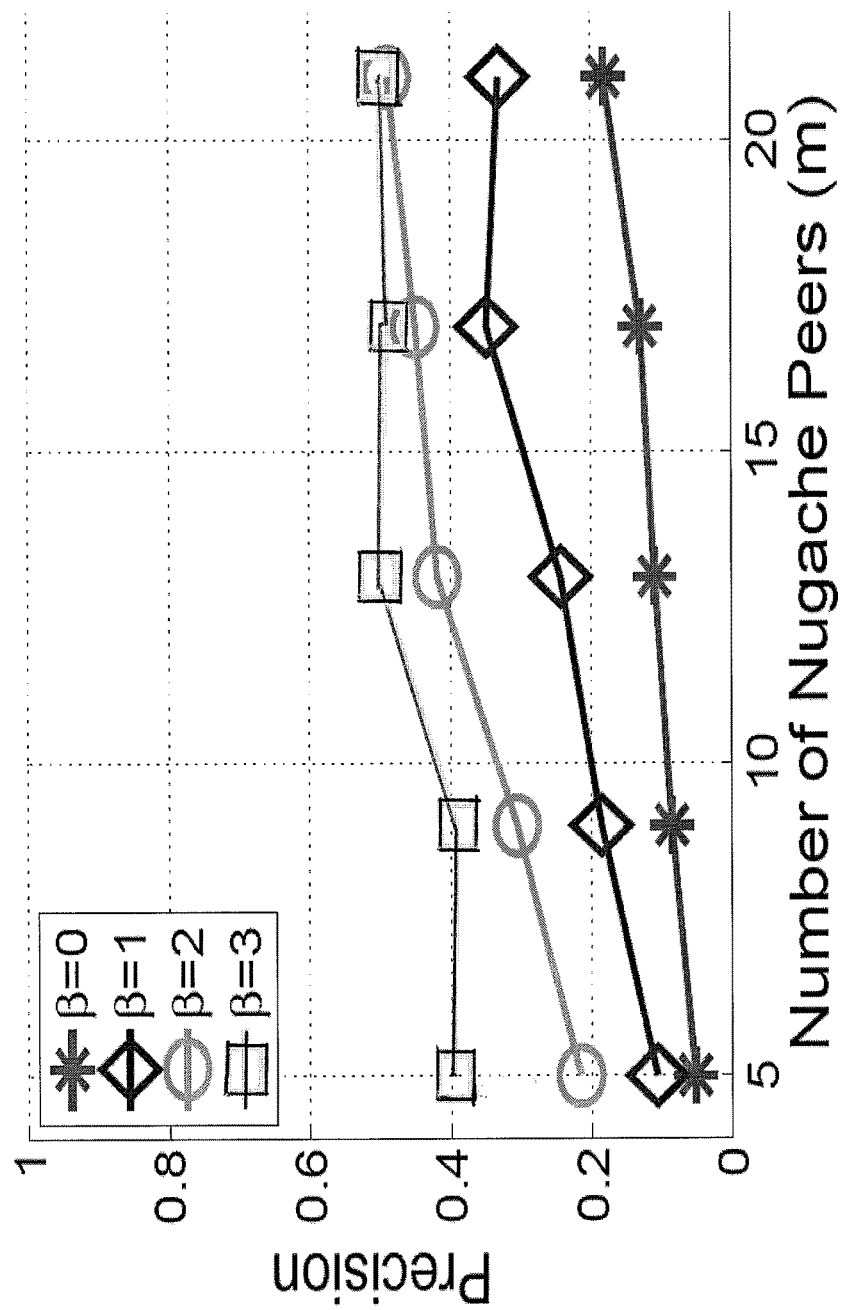
FIG. 24 illustrates precision values versus number of Nugache peers for different node degree sensitivity coefficient values, in an exemplary simulated system consistent with the present invention.
Figure 25:
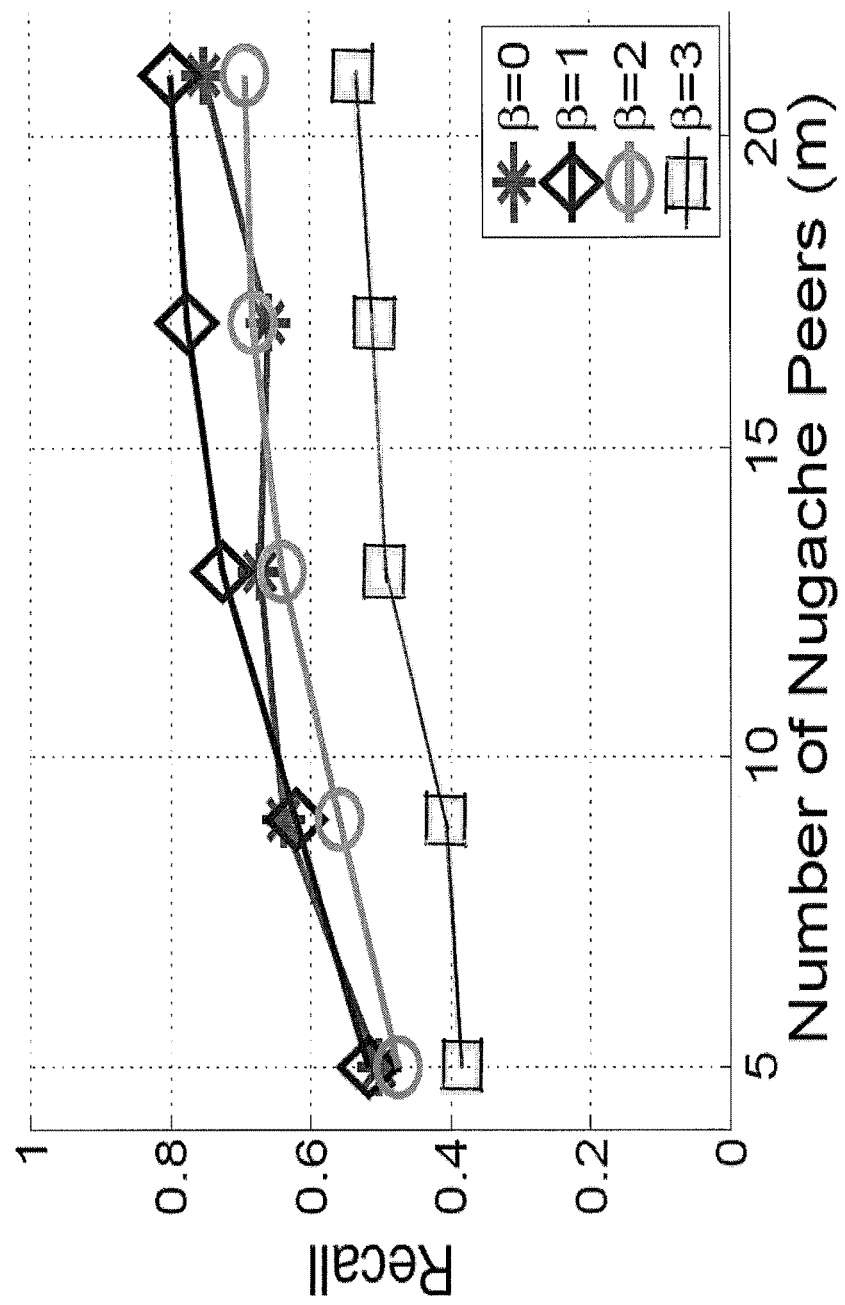
FIG. 25 illustrates recall values versus number of Nugache peers for different node degree sensitivity coefficient values, in an exemplary simulated system consistent with the present invention.

Larger $\beta$ values result in less dye-flow towards the nodes which have high degrees on a mutual contacts graph. The dye-flow was restricted to high-degree nodes, because edges between bots and high degree nodes are probably not due to botnet communications but rather due to some other application which causes many of the edges that high-degree nodes have. Larger $\beta$ values cause the dye to concentrate around the seed bot and therefore improve the precision performance as observed in FIG. 24, which depicts the precision values for different node degree sensitivity coefficients. On the other hand, since the dye pumping process may not reach far in the mutual-contacts graph for larger $\beta$ values, the recall performance drops as $\beta$ gets larger as shown in FIG. 25, which depicts recall values for different node degree sensitivity coefficients. According to the experiments, $\beta=2$ turned out to be an appropriate setting for the network.

In summary, different values of the parameters k and $\beta$ yield a tradeoff between precision and recall. When deploying the proposed scheme, a network administrator should first decide on the minimum tolerated precision level and then set the parameters accordingly. For this purpose, artificial P2P botnet traffic generated by the Random Peer Selection model described in the following section could be used as a ground truth to determine which parameter values would result in which precision levels for a given network.

§5.5.2.2 Mathematical Analysis

The essence of the proposed method is that the members of a P2P botnet tend to have mutual contacts and therefore are closely connected on a corresponding private mutual contacts graph. In fact, the dye pumping process performs better if P2P bots in a network are connected to the seed node through shorter and higher-capacity paths, which yield higher volume of dye flow from the seed node to the other bots. Although the experimental results in the previous section tend to validate our intuition, some significant questions remain to be addressed to mathematically validate the approach and show its applicability to the general problem that goes beyond specific instances of P2P botnets. Question such as how likely is it that two peer bots will have a mutual contact? How does this probability vary with the size of the botnet and the number of peers contacted by each bot? How likely is it that the mutual contacts graph will have a connected component that spans peer bots? How are the properties of the mutual contacts graph characterized? In the following sections these questions are addressed and a mathematical analysis that supports our approach and validates the experimental results reported in the previous section are presented.

§5.5.2.2.1 Random Peer Selection Model

The first question posed was the likelihood of peer bots having a mutual contact. But before that question is answered, first the framework in which this question is examined is justified. Recall that the framework assumes that bots independently and randomly select the peers with which they communicate. How does this assumption bias the analysis? In this subsection, this question is addressed and it is argued that this represents the worst case situation for our analysis.

In a P2P network some peers might be more available than others and therefore they have a higher probability of being selected by other peers. (See, for example, J. B. Grizzard, V. Sharma, C. Nunnery, B. B. Kang, and D. Dagon, "Peer-to-peer botnets: overview and case study," *HotBots '07: Proceedings of the first conference on First Workshop on Hot Topics in Understanding Botnets*, (2007); T. Holz, M. Steiner, F. Dahl, E. Biersack, and F. Freiling, "Measurements and mitigation of peer-to-peer-based botnets: a case study on Storm Worm," *LEET '08: Proceedings of the 1st Usenix Workshop on Large-Scale Exploits and Emergent Threats*, (2008); B. B. Kang, E. Chan-Tin, C. P. Lee, J. Tyra, H. J. Kang, C. N. Z. Wadler, G. Sinclair, N. Hopper, D. Dagon, and Y. Kim, "Towards complete node enumeration in a peer-to-peer botnet," *Proceedings of ACM Symposium on Information, Computer and Communications Security*, ASIACCS 2009, (March 2009); and R. Bhagwan, S. Savage, and G. M. Voelker, "Understanding availability," *The 2nd International Workshop on Peer-to-Peer Systems*, (2003). Obviously, having such preferred peers in a P2P botnet increases the chance of finding mutual-contacts between P2P bots in a network. However, the worst case, as long as unstructured P2P botnets are considered, from the experiment's point of view is when there is no preferred peer in the botnet and all peers have equal probability of being contacted by any other peer, thereby minimizing the probability of private mutual contacts between peers.

To investigate the probability of mutual-contacts in the worst case, a generic botnet model, where each bot picks peers independently and randomly is considered. The model has two configurable parameters such that; "B" is the number of all peers in the botnet and "C" is the number of peers that each peer communicates with during a specific observation window. Based on these parameters, each bot ($b_i$) in the model communicates with a uniform random subset ($S_i$) of all B-1 available bots (excluding itself) in the model, where the cardinality of each subset is C.

Bot-Edge Probability

Having justified our framework, the question about the probability of two peer bots having a mutual contact is now addressed. In the random peer selection model, the probability of having an edge between two arbitrary bots $b_i$ and $b_j$ (i.e. bot-edge probability, $p_e$) is actually the probability of the intersection of the corresponding subsets being non-empty; such that $p_e = P_r(S_i \cap S_j \neq \emptyset)$. Since the number of elements in the intersection of two uniform random subsets can be computed using hyper geometric distribution, the bot-edge probability can be written as:

$$p_e = 1 - \frac{\binom{C}{0}\binom{B-1-C}{C}}{\binom{B-1}{C}} \qquad (11)$$

Figure 26:
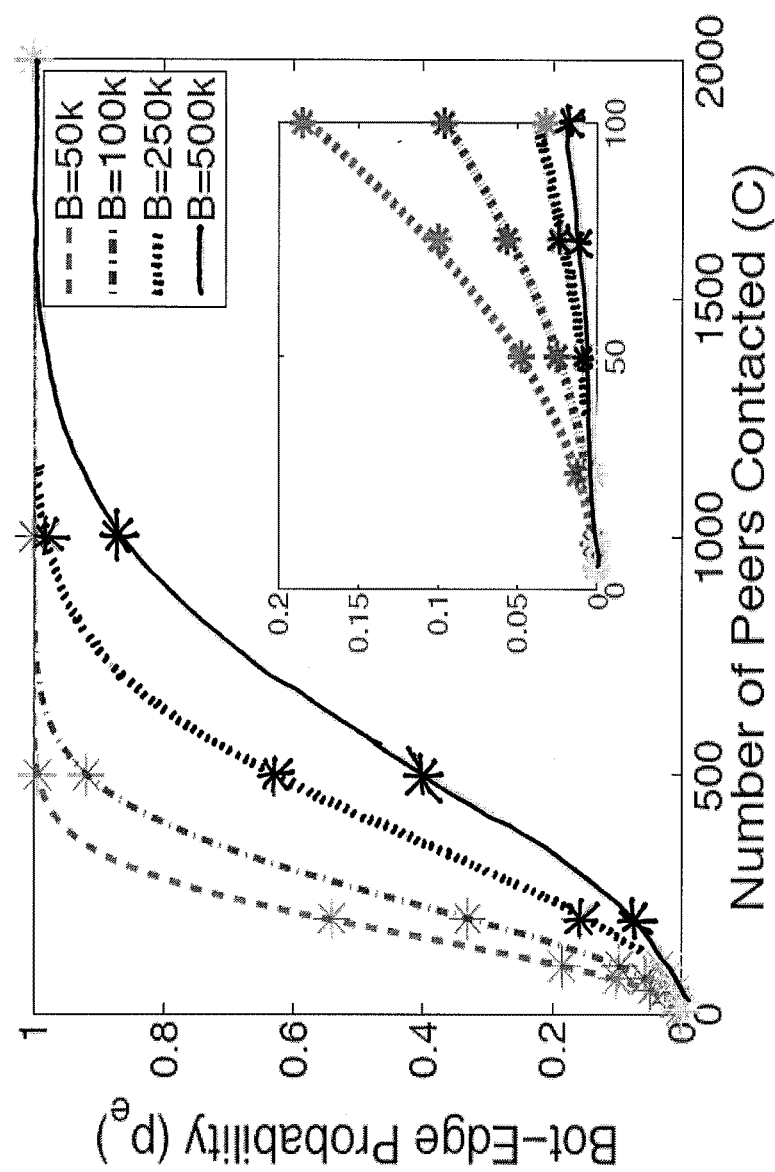
FIG. 26 illustrates bot edge probability for different botnet sizes and different number of contacted Nugache peers, in an exemplary simulated system consistent with the present invention.

FIG. 26 depicts bot-edge probability for different botnet sizes and different number of peers contacted. With reference to FIG. 26, it is observed that, similar to birthday paradox, as the number of contacted peers increases, the bot-edge probability increases very rapidly. Consequently, even for a fairly large botnet with 50 k peers, the bot-edge probability is almost 0.5 when peers contact only 200 other peers during the observation window.

Bot-Edge Capacity

Although high bot-edge probabilities works in favor of the dye pumping process, the capacities of those edges are also important. It is obvious that, the higher the bot-edge capacities the better the dye-pumping process performs. In the random peer selection model, the probability of a peer contacted by two given peers is $$\left(\frac{C}{B}\right)^2.$$

Figure 27:
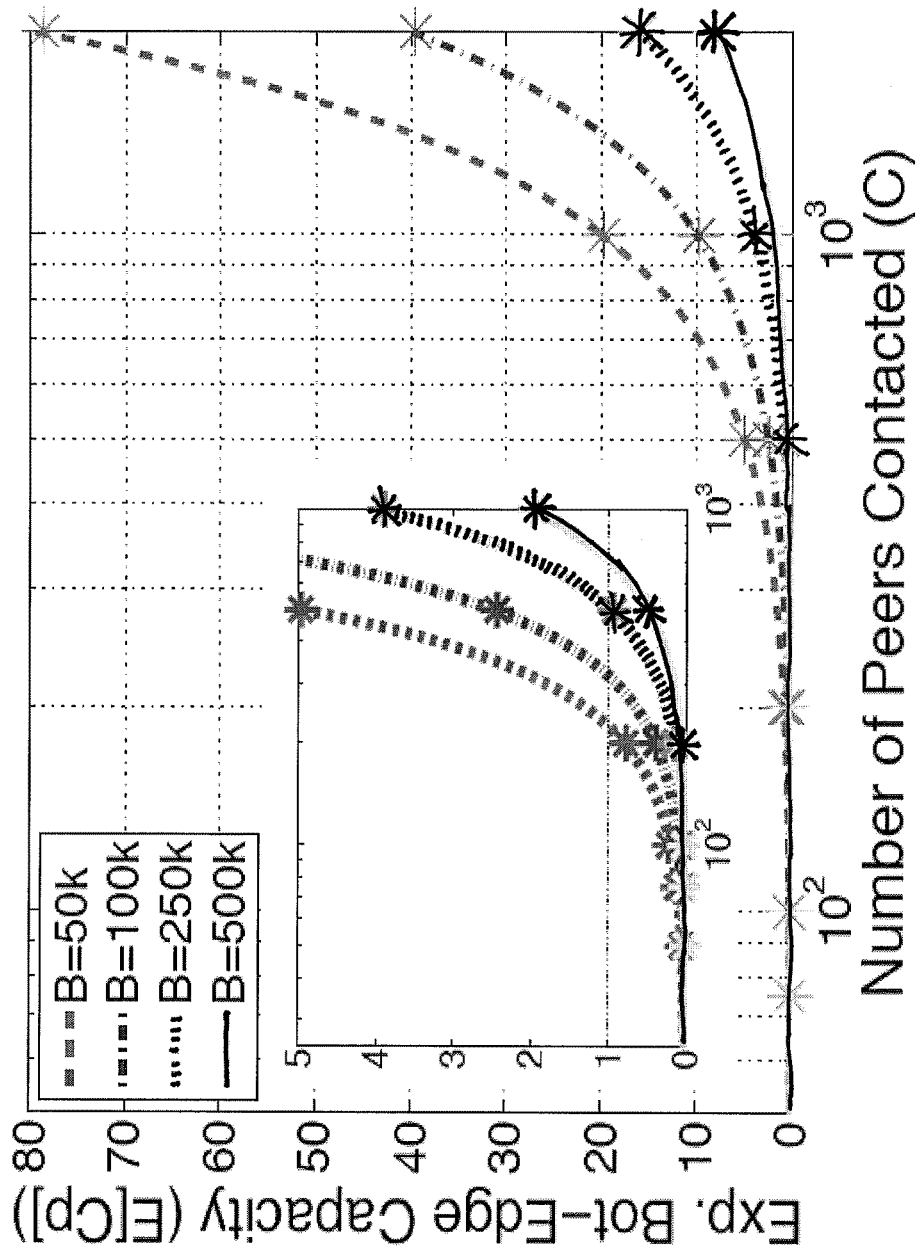
FIG. 27 illustrates expected bot edge capacity for different botnet sizes and different number of contacted Nugache peers, in an exemplary simulated system consistent with the present invention.

Therefore, since there are B peers in total, the expected capacity of bot edges can be written as $E[C_p]$ as:

$$E[C_p] = \left(\frac{C}{B}\right)^2 B = \left(\frac{C}{B}\right)^2 \qquad (12)$$

which is also the expected value of the corresponding hyper geometric distribution. FIG. 24 depicts the expected bot-edge capacities for different botnet sizes and different number of peers contacted. With reference to FIG. 26, it is observed that, regardless of the botnet size, expected bot-edge capacity rapidly exceeds 1 and continues to increase as the number of contacted peers increases. FIGS. 26 and 27 suggest that the members of a P2P botnet will most probably be well connected with each other on a private mutual contacts graph through high capacity identify edges, thereby allowing the dye pumping process to identify them.

§5.5.2.2.2 Friends Stay Closely Connected (Erdös-Rényi Subgraphs)

Having established that it is quite likely that two peer bots will have a mutual contact we now turn our attention to the expected structure of the mutual contacts graph. The dye pumping process identifies the P2P bots which are connected to the seed-bot via short paths on the mutual-contacts graph. Bots which are isolated from the seed-bot are not accessed by the process. In this subsection, given a bot-edge probability, we investigate how the P2P bots are expected to be oriented on a private mutual contacts graph and what portion of the P2P nodes can be accessed by the dye pumping process. To understand the structure of the subgraph formed by members of a P2P botnet on a private mutual contacts graph, suppose that there are m bots in the network, and therefore the corresponding m nodes on the graph. Let the set $X=\{X_1, X_2, \ldots, X_m\}$ denote these nodes and $p_e$ denote the probability of having an edge between any given $X_i$ and $X_j$, for $i \neq j$ where $1 \leq i \leq m$ and $1 \leq j \leq m$. Since $p_e$ is the same for any pair of $X_i$ and $X_j$, the subgraph formed by the nodes X1, X2, ..., Xm on a private mutual-contacts graph is an Erdos-Rényi random graph (See, for example, P. Erdos and A. Renyi, "On random graphs," *Publ. Math. Debrecen* 6, pages 290-297, (1959); and P. Erdos and A. Renyi, "The evolution of random graphs," *Magyar Tud. Akad. Mat. Kutato Int. Kozl* 5, pages 17-61, (1960)) where each possible edge in the graph appears with equal probability.

One interesting property shown by Erdos and Rényi is that, Erdos-Rényi graphs have a sharp threshold of edge probability for graph connectivity. (See, for example, P. Erdos and A. Renyi, "The evolution of random graphs," *Magyar Tud. Akad. Mat. Kutato Int. Kozl* 5, pages 17-61, (1960)) More specifically, if the edge probability is greater than the threshold then almost all of the graphs produced by the model will be connected. Erdos and Rényi have shown the sharp connectivity threshold is $\ln \theta/\theta$, where $\theta$ is the number of nodes in the graph. Therefore, if the bot-edge probability of a P2P botnet is $p_e=\ln m/m$, then the dye pumping process potentially identifies all other P2P bots from a given seed bot with high probability as long as there are more than m bots in the network. In other words, it gets easier for the proposed method to reveal P2P bots as the botmaster infects more hosts in the network. However, even if the bot-edge probability is below the threshold, the dye-pumping process can still identify some of the P2P bots, which happen to be connected to the seed node on the private mutual-contacts graph. In conclusion, according to the random peer selection model, members of a P2P botnet are expected to be closely connected to each other on a private mutual contacts graph despite large botnet sizes.

§5.5.3 Potential Improvements

The proposed method is able to identify P2P bots in a network in which they are clustered through short and high capacity paths on a private mutual contact graph. Therefore, botmasters need to disturb this clustering structure in order to evade the proposed method. In this section, these possible evasion strategies, and their implications on the creation and maintenance of P2P botnets are reviewed.

Eliminating Private Mutual-Contacts

One way to eliminate private mutual contacts is by increasing the popularity of private mutual contacts that P2P bots in a network communicate with. If their popularity gets higher than the privacy threshold (k), they will be omitted by the proposed scheme and will not result in edges in private mutual-contacts graphs. However, in order to achieve this, a botmaster has to control more than k hosts in that particular network, so that they can collectively boost a contact's popularity. To defend against this strategy, the privacy threshold (k) needs to be set as large as possible. Although high k values increase the number of benign edges in private mutual-contacts graphs, in most cases it is possible to find an appropriate k value. Also, for large networks potentially containing many P2P bots, the proposed method can be used independently on smaller subnets to make sure that the number of P2P bots is below the privacy threshold.

One way to eliminate private mutual contacts is by increasing the popularity of private mutual-contacts that P2P bots in a network communicate with. If their popularity gets higher than the privacy threshold (k), they will be omitted by the proposed scheme and will not result in edges in private mutual contacts graphs. However, in order to achieve this, a botmaster has to control more than k hosts in that particular network, so that they can collectively boost a contact's popularity beyond the privacy threshold. To defend against this strategy, the privacy threshold (k) needs to be set as large as possible. Although, as discussed above, high k values impairs the recall performance of the proposed scheme, for smaller networks it is often possible to find an appropriate k value since a botmaster is unlikely to have too many bots in a small network. On the other hand, for large networks which potentially contain many P2P bots, the proposed technique can be applied on smaller subnets separately and independently to increase the likelihood that the number of P2P bots in each subnet remain below the privacy threshold.

Decreasing the Probability of Mutual-Contacts

Decreasing the probability of observing private mutual-contacts between P2P bots is equivalent to decreasing the bot-edge probability. Recall that, in Section 4.3 the bot-edge probability is shown to be $p_e \approx 1-[1-(C/B)^2]^B$ when the bots select their peers uniformly at random. In order to decrease $p_e$, a botmaster has to either increase the botnet size (B) or decrease the number of other peers that a P2P bot communicates with (C). In Section 5 the proposed scheme is shown to perform satisfactorily for P2P botnets composed of as many as 500000 active peers, as long as peers communicate with an enough number of other peers (more than $\sqrt{5000000} \approx 700$). And one can suspect that, a member of a today's P2P botnet with such a large size usually needs to communicate with substantial number of other peers in order to achieve reliable information dissemination across the botnet.

Decreasing the probability of observing mutual-contacts between P2P bots is equivalent to decreasing the bot-edge probability ($p_e$). As discussed above, a botmaster has to either (or both) increase the botnet size (B) or decrease the number of peers that each bot communicates with (C) in order to lower $p_e$. It is clear that increasing B and decreasing C will inversely affect a P2P botnet's robustness and efficiency. Although it may be possible for a botmaster to pull $p_e$ down to a lower value, it was observed in a controlled environment that peers of botnets such as Storm and Waledac have very high bot-edge probabilities. To collect data for Storm and Waledac, two Pentium IV, 512 MB RAM Windows XP hosts were infected and were completely isolated from the rest of the network by a firewall. The firewall was also set to block all SMTP traffic to prevent any spam traffic.

TABLE 3

| P2P Botnet | Day 1 | | Day 2 | | Day 3 | |
|---|---|---|---|---|---|---|
| | Δ | ○ | Δ | ○ | Δ | ○ |
| Storm | 5180 | 2861 | 4681 | 2886 | 4022 | 2323 |
| Waledac | 1145 | 341 | 775 | 300 | 1012 | 358 |
| Nugache | 45 | 0 | 53 | 1 | 49 | 0 |

Δ: Average number of unique IP addresses that a bot communicates with each day.
○: the number of mutual-contacts (the bot-edge capacities) between the two bots during 24 hours.

Table 3 shows a summary of observed P2P botnet behavior. It is observed that both Storm and Waledac communicate with fairly high number of unique peers during 24 hours, and therefore create many mutual-contacts as presented in Table 3. On the contrary, Nugache peers are less active and create far less mutual-contacts as observed in Table 3. Nevertheless, the proposed scheme successfully detects several Nugache peers (as described earlier), which are introduced to the network using the crawler data, despite their low communication activities. To collect data for Nugache, the bots were installed on a Pentium IV, 1 GB RAM, running VMware Server with a Windows XP guest, as well as on bare metal machines on comparable hardware running Windows XP. The traces were captured within the protected network using a customized honeywall (See, for example, "The Honeynet Project", *Honeywall*, https://projects.honeynet.org/honeywall/, (2009)) and also using full-packet capture on an extrusion prevention system running OpenBSD with strict packet filter rules, as described in D. Dittrich and S. Dietrich, "P2P as botnet command and control: A deeper insight," *MALWARE* 2008. *3rd International Conference on Malicious and Unwanted Software*, (2008). The captured packets were converted to flow records using the SiLK tools (See, for example, "CERT Coordination Center," *SiLK: System for internet-level knowledge*, http://tools.netsa.cert.org/silk/) for establishing mutual contact sets and validating the process.

Using a Structured P2P Topology

A botmaster can adopt a structured P2P topology to decrease the probability of mutual contacts by making peers in a same network to communicate with different sets of peers from each other. To achieve this, peers in a same network have to coordinate with each other so that they won't communicate with the peers in each other's peer list. In some sense, peers in a same network have to form their own tiny botnet among themselves and appear as a single node to the remaining of the P2P botnet. These intra-network communications among the peers in a same network, however, would potentially yield new means of detecting P2P bots in a network. Nevertheless, even if a botmaster manages to deploy a mutual-contact-free P2P architecture, two or more networks can choose to share their flow records to exploit the mutual-contacts among P2P bots in different networks, which are unavoidable since the botmaster cannot know which networks would collaborate in the first place. For such mitigation strategies, cooperating networks can use privacy-preserving set operations such as, L. K. Dawn and D. Song, "Privacy-preserving set operations," *Advances in Cryptology—CRYPTO* 2005, *LNCS*, pages 241-257, (2005) to share data between networks without revealing any sensitive information.

Poisoning Clusters

A similar approach to cluster poisoning was proposed in the article: "SwarmScreen: Privacy Through Plausible Deniability in P2P Systems", *Northwestern EECS Technical Report*, (March 2009), in the context of P2P user privacy. In the above article, authors first show that adversaries can learn different communities in Bit-Torrent and which community a user belongs to. Their basic idea is that the users belonging to a community communicates with each other more heavily than they communicate with out of community users. In their work, authors propose a method to conceal user communities, where they poison communities by making BitTorrent clients also contact with random peers aside from regular user traffic. As a result the community structure of the P2P network will be destroyed. However, such cluster poisoning is not trivial in the context of our work. In order to create an edge between a P2P bot and a benign node, one should make them both communicate with a mutual external host. There are two ways to achieve this: First way is that the botmaster can take control of the benign host and make it communicate with a desired mutual-contact. However, in this case the benign host will not be benign anymore and should be identified by the proposed algorithm. The second way is that the botmaster can listen to the traffic of the benign host and make the P2P bot contact with an external host which the benign host has communicated with. But it's not plausible for a botmaster to listen the network traffic of benign hosts unless he/she also possesses a router or a proxy in the same network.

The purpose of cluster poisoning for P2P networks is to destroy clustering structure of a graph by creating bogus edges. (See, for example, D. R. Choffnes, J. Duch, D. Malmgren, R. Guierma, F. E. Bustamante, and L. Amaral, "Swarmscreen: Privacy Through Plausible Deniability in P2P systems. Technical Report," *Northwestern EECS Technical Report*, (March 2009)) Cluster poisoning appears to be very hard to achieve in the context of the present invention. In order to perform poisoning, a botmaster has to create an edge between a P2P bot and a benign node on a mutual-contacts graph. For this purpose, both the bot and the benign host have to be made to communicate with a mutual external IP. To do so, the botmaster has to listen to the traffic of the benign host and make the P2P bot contact with an external host which the benign host has communicated with. But this is not a trivial task for a botmaster, unless the botmaster also possesses a router or a proxy in the same network.

P2P Bots in a Network Selecting Distinct Peers

One could think of a delicate peer selection strategy which ensures that the P2P bots in a same network contact a different set of peers. As a result, there would be no private mutual-contacts and therefore no edges between P2P bots in a network. However, ensuring that P2P bots in same networks have disjoint peer lists is equivalent to the following graph coloring problem: Suppose the entire P2P botnet is represented by a graph where nodes are the peers and there's an edge between two nodes if the corresponding peers communicate with each other. Also suppose that each node has a color such that the nodes within the same network have the same color. To ensure that peers within a same network don't have any mutual contacts, the botmaster has to place edges in the graph such that no two neighbors of a node have the same color. Graph coloring problems are usually hard to solve and in some cases they don't have a solution at all. In those cases, an approximate solution might still help in reducing the number of private mutual-contacts between P2P bots in a same network. But still, several obstacles remain preventing the botmaster to approach the problem. First of all, the botmaster needs to know the IP addresses of all her bots. However, usually such a list is very dynamic with several bots being excluded and several new bots being appended every day. Therefore, botmaster needs to solve the problem continuously and frequently update P2P bots with the new peer lists. Even if the list was stable, it wouldn't be trivial for the botmaster to obtain the list without her bots communicating with other bots of their own choice, thereby potentially causing private mutual-contacts. On the other hand, another option could be P2P bots in same networks trying to solve their portion of the problem locally. However, such a distributed strategy also brings several obstacles. First of all, peers in the same network needs to find and communicate with each other, potentially resulting in private mutual-contacts by itself only. Furthermore, even if the P2P bots in one network solve their own problem, they potentially ruin the solution of another set of P2P bots in another network by becoming private mutual-contacts themselves for the P2P bots in another network.

§5.6 Conclusion

As can be appreciated from the foregoing, exemplary embodiments consistent with the present invention provide methods and apparatus for identifying P2P bots of network using a discovered bot. Unlike the previously known methods, the exemplary methods do not have to wait for the P2P bots to exhibit any overt behavior to identify them. Also, unlike the previously known methods, the exemplary methods consistent with the present invention does not required the P2P bots to exhibit a behavior common with all other P2P bots. Further, simulation results and mathematical analysis of the proposed dye pumping process showed that the process identifies several dormant P2P bots in a network effectively.

What is claimed is:

1. A computer-implemented method for identifying a peer-to-peer bot of a peer-to-peer botnet, the computer-implemented method comprising:
   a) determining, with a computer system, a candidate set of peer-to-peer bots of the peer-to-peer botnet by:
      (i) identifying a set of one or more computers in a network having a plurality of computers, each having a private mutual contact with a computer that has been identified as a seed bot, wherein the private mutual contact is defined as a mutual contact that communicates with less than a determined number of computers in the network in a given time interval, the determined number being a privacy threshold, and wherein the private mutual contact is external to the network;
      (ii) identifying an additional set of one or more computers, each having a private mutual contact with the identified set of one or more computers; and
      (iii) defining the candidate set to include both computers belonging to the identified set and computers belonging to the identified additional set;
   b) storing, on a processor-readable medium, information identifying computers of the candidate set;
   c) determining, with the computer system and for each candidate computer in the candidate set, a confidence level indicative of a certainty of a membership of the candidate computer in the peer-to-peer botnet;
   d) determining, with the computer system and for each candidate computer in the candidate set, whether the confidence level of the candidate computer exceeds a determined threshold confidence level;
   e) identifying, with the computer system, at least one of the candidate computers as a peer-to-peer bot of the peer-to-peer botnet, responsive to a determination that the confidence level of the at least one of the candidate computers exceeds the determined threshold confidence level; and
   f) taking an action on the identified candidate computers based on a policy, wherein the action comprises monitoring network traffic of the identified candidate computers or executing a diagnostic tool on the identified candidate computers to confirm whether the identified candidate computers are bots.

2. The computer-implemented method of claim 1, wherein determining the candidate set of peer-to-peer bots comprises repeating (ii) until less than a predetermined number of identified computers are added to the additional set.

3. The computer-implemented method of claim 1, wherein the confidence level is a function of a number of private mutual contacts the at least one of the candidate computers has with the seed bot.

4. The computer-implemented method of claim 1, wherein the confidence level is a function of a number of private mutual contacts the at least one of the candidate computers has with other candidate computers.

5. The computer-implemented method of claim 1, wherein the private mutual contact and the candidate computers in the candidate set are identified using network flow data recorded by a router of the network.

6. The computer-implemented method of 5, wherein the network flow data used to identify the private mutual contact and the candidate computers includes a source Internet Protocol address and a destination Internet Protocol address.

7. The computer-implemented method of claim 1, wherein the threshold confidence level is derived empirically.

8. The computer-implemented method of claim 1, wherein the confidence level is determined, with the computer system, using an iterative graph traversal method.

9. The computer-implemented method of claim 8, wherein the iterative graph traversal method represents the plurality of computers in the network as a private mutual contacts graph G=(N,E), where
   N indicates nodes corresponding to the plurality of computers, and
   E indicates edges connecting the nodes having private mutual contacts.

10. The computer-implemented method of claim 9, wherein the edges of the private mutual contacts graph have an edge capacity indicative of a number of private mutual contacts between a pair of nodes connected by an edge.

11. The computer-implemented method of claim 9, wherein determining the confidence level using the iterative graph traversal method comprises:
   computing, with the computer system, an adjacency matrix A of the private mutual contacts graph G;
   normalizing the adjacency matrix A; and
   computing, with the computer system, a dye level vector L based on the adjacency matrix A, as L=AL.

12. The computer-implemented method of claim 11, wherein computing the adjacency matrix A comprises:
   computing, with the computer system, the adjacency matrix A as $A(i,j)=C_p(E_{ij})$, where
   A is a matrix of size v*v,
   v is a number of nodes in the private mutual contacts graph, and
   $C_p(E_{ij})$ is an edge capacity of an edge connecting nodes i and j.

13. The computer-implemented method of claim 11, wherein computing the adjacency matrix A comprises:
   computing, with the computer system, the adjacency matrix A as $A(i,j)=\gamma_{ji}$, where
   $\gamma_{ji}$ is a dye attraction coefficient and $\gamma_{ji}=C_p(E_{ij})/(D_i)^\beta$, where
   $C_p(E_{ij})$ is an edge capacity of an edge connecting nodes i and j;
   $D_i$ is a degree of node i indicating a number of edges a node i has, and
   $\beta$ is a node degree sensitivity coefficient.

14. The computer-implemented method of claim 11, wherein computing the dye level vector L comprises:
   computing, with the computer system, the dye level vector L as $L(i)=\Sigma_{j=1}^{v} A(j,i)L(j)$, where
   v is a number of nodes in the private mutual contacts graph,
   L is a vector of size 1*v, and
   L(i) is a dye level at a node i.

15. The computer-implemented method of claim 14, wherein computing the dye level vector L comprises:
   incrementing a dye level in a node corresponding to the seed bot by a determined value; and
   normalizing the dye level vector L as $L=L/\Sigma_{i=1}^{v} L(i)$.

16. The computer-implemented method of claim 14, wherein the confidence level of the at least one of the candidate computers is determined using the dye level L(i) in the node i.

17. The computer-implemented method of claim 14, wherein the dye level L(i) at the node i is proportional to edge capacities of edges connecting node i with other nodes.

18. The computer-implemented method of claim 11, wherein normalizing the adjacency matrix A comprises normalizing the adjacency matrix A as $A(i,j)=A(i,j)/\Sigma_{i=1}^{v}A(i,j)$.

19. The computer-implemented method of claim 11, wherein the act of computing the dye level vector L is repeated a determined number of times.

20. The computer-implemented method of claim 1, wherein at least two identified candidate computers need not communicate with a same private mutual contact.

21. Apparatus for identifying a peer-to-peer bot of a peer-to-peer botnet, the apparatus comprising:
   a) at least one processor;
   b) at least one input device; and
   c) at least one storage device storing program instructions which, when executed by the at least one processor, performs a method including:
      1) determining, with a computer system, a candidate set of peer-to-peer bots of the peer-to-peer botnet by:
         (i) identifying a set of one or more computers in a network having a plurality of computers, each having a private mutual contact with a computer that has been identified as a seed bot, wherein the private mutual contact is defined as a mutual contact that communicates with less than a determined number of computers in the network in a given time interval, the determined number being a privacy threshold, and wherein the private mutual contact is external to the network;
         (ii) identifying an additional set of one or more computers, each having a private mutual contact with the identified set of one or more computers; and
         (iii) defining the candidate set to include both computers belonging to the identified set and computers belonging to the identified additional set;
      2) storing, on the storage device, information identifying computers of the candidate set;
      3) determining, with the computer system and for each candidate computer in the candidate set, a confidence level indicative of a certainty of a membership of the candidate computer in the peer-to-peer botnet;
      4) determining, with the computer system and for each candidate computer in the candidate set, whether the confidence level of the candidate computer exceeds a determined threshold confidence level;
      5) identifying, with the computer system, at least one of the candidate computers as a peer-to-peer bot of the peer-to-peer botnet, responsive to a determination that the confidence level of the at least one of the candidate computers exceeds the determined threshold confidence level; and
      6) taking an action on the identified candidate computers based on a policy, wherein the action comprises monitoring network traffic of the identified candidate computers or executing a diagnostic tool on the identified candidate computers to confirm whether the identified candidate computers are bots.

22. The apparatus of claim 21, wherein at least two identified candidate computers need not communicate with a same private mutual contact.

23. An article of manufacture comprising:
   a non-transitory machine-readable medium having instructions which, when executed by a machine, performs a method including:
      a) determining, with a computer system, a candidate set of peer-to-peer bots of the peer-to-peer botnet by:
         (i) identifying a set of one or more computers in a network having a plurality of computers, each having a private mutual contact with a computer that has been identified as a seed bot, wherein the private mutual contact is defined as a mutual contact that communicates with less than a determined number of computers in the network in a given time interval, the determined number being a privacy threshold, and wherein the private mutual contact is external to the network;
         (ii) identifying an additional set of one or more computers, each having a private mutual contact with the identified set of one or more computers; and
         (iii) defining the candidate set to include both computers belonging to the identified set and computers belonging to the identified additional set;
      b) storing, on the storage device, information identifying computers of the candidate set;
      c) determining, with the computer system and for each candidate computer in the candidate set, a confidence level indicative of a certainty of a membership of the candidate computer in the peer-to-peer botnet;
      d) determining, with the computer system and for each candidate computer in the candidate set, whether the confidence level of the candidate computer exceeds a determined threshold confidence level;
      e) identifying, with the computer system, at least one of the candidate computers as a peer-to-peer bot of the peer-to-peer botnet, responsive to a determination that the confidence level of the at least one of the candidate computers exceeds the determined threshold confidence level; and
      f) taking an action on the identified candidate computers based on a policy, wherein the action comprises monitoring network traffic of the identified candidate computers or executing a diagnostic tool on the identified candidate computers to confirm whether the identified candidate computers are bots.

24. The article of manufacture of claim 23, wherein at least two identified candidate computers need not communicate with a same private mutual contact.

25. The computer-implemented method of claim 1 wherein the privacy threshold is a whole number.

26. The apparatus of claim 21 wherein the privacy threshold is a whole number.

27. The article of manufacture of claim 23 wherein the privacy threshold is a whole number.

* * * * *